(12) United States Patent
Kato et al.

(10) Patent No.: US 10,108,896 B2
(45) Date of Patent: *Oct. 23, 2018

(54) RFIC MODULE AND RFID TAG INCLUDING THE SAME

(71) Applicant: Murata Manufacturing Co., Ltd., Nagaokakyo-shi, Kyoto-fu (JP)

(72) Inventors: Noboru Kato, Nagaokakyo (JP); Kunihiro Komaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,100

(22) Filed: Dec. 15, 2017

(65) Prior Publication Data

US 2018/0114104 A1    Apr. 26, 2018

Related U.S. Application Data

(63) Continuation of application No. 15/366,050, filed on Dec. 1, 2016, now Pat. No. 9,881,248, which is a (Continued)

(30) Foreign Application Priority Data

Nov. 27, 2014  (JP) ................................ 2014-239824
Feb. 19, 2015  (JP) ................................ 2015-030318

(51) Int. Cl.
*G06K 19/06*    (2006.01)
*G06K 19/077*   (2006.01)
(Continued)

(52) U.S. Cl.
CPC ........... *G06K 19/077* (2013.01); *G06K 19/07* (2013.01); *H01F 17/0013* (2013.01); (Continued)

(58) Field of Classification Search
CPC .......... G06K 19/06; G06K 5/00; G06K 19/00; G06K 7/08; G06F 17/00
(Continued)

(56) References Cited

U.S. PATENT DOCUMENTS

| 2008/0048863 A1* | 2/2008 | Copeland ........... G06K 19/0726 340/572.1 |
| 2009/0033467 A1* | 2/2009 | Finocchiaro ............. H04B 5/00 340/10.1 |

(Continued)

OTHER PUBLICATIONS

Kato et al., "RFIC Module and RFID Tag Including the Same", U.S. Appl. No. 15/366,050, filed Dec. 1, 2016.

*Primary Examiner* — Edwyn Labaze
(74) *Attorney, Agent, or Firm* — Keating & Bennett, LLP

(57) ABSTRACT

An RFIC chip includes a first input/output terminal and a second input/output terminal and is built into a multilayer substrate. A power feeding circuit includes coil conductors and is built into the multilayer substrate. A first coil conductor includes a first coil end connected to the first input/output terminal, and a second coil conductor includes a second coil end connected to the second input/output terminal. First and second terminal electrodes are connected to one end of the first coil conductor and one end of the second coil conductor, respectively. A first coil portion is disposed in a section extending from the first coil end to the first position and a second coil portion is disposed in a section extending from the second coil end to the second position. The RFIC chip is interposed between the first coil portion and the second coil portion in a planar view of the multilayer substrate.

14 Claims, 18 Drawing Sheets

Related U.S. Application Data continuation of application No. PCT/JP2015/082287, filed on Nov. 17, 2015.

(51) Int. Cl.
   *H01Q 9/26* (2006.01)
   *H01F 27/29* (2006.01)
   *H01Q 1/22* (2006.01)
   *H01Q 1/40* (2006.01)
   *H01Q 7/00* (2006.01)
   *H01F 17/00* (2006.01)
   *G06K 19/07* (2006.01)

(52) U.S. Cl.
   CPC ......... *H01F 27/292* (2013.01); *H01Q 1/2225* (2013.01); *H01Q 1/40* (2013.01); *H01Q 7/00* (2013.01); *H01Q 9/26* (2013.01)

(58) Field of Classification Search
   USPC .................. 235/492, 375, 380, 487, 451
   See application file for complete search history.

(56) References Cited

U.S. PATENT DOCUMENTS

| | | | | |
|---|---|---|---|---|
| 2011/0284641 | A1* | 11/2011 | Yang | G06K 19/07786 235/492 |
| 2012/0018505 | A1* | 1/2012 | Jiang | G06K 19/07749 235/375 |
| 2014/0361089 | A1* | 12/2014 | Kai | H01Q 1/38 235/492 |

* cited by examiner

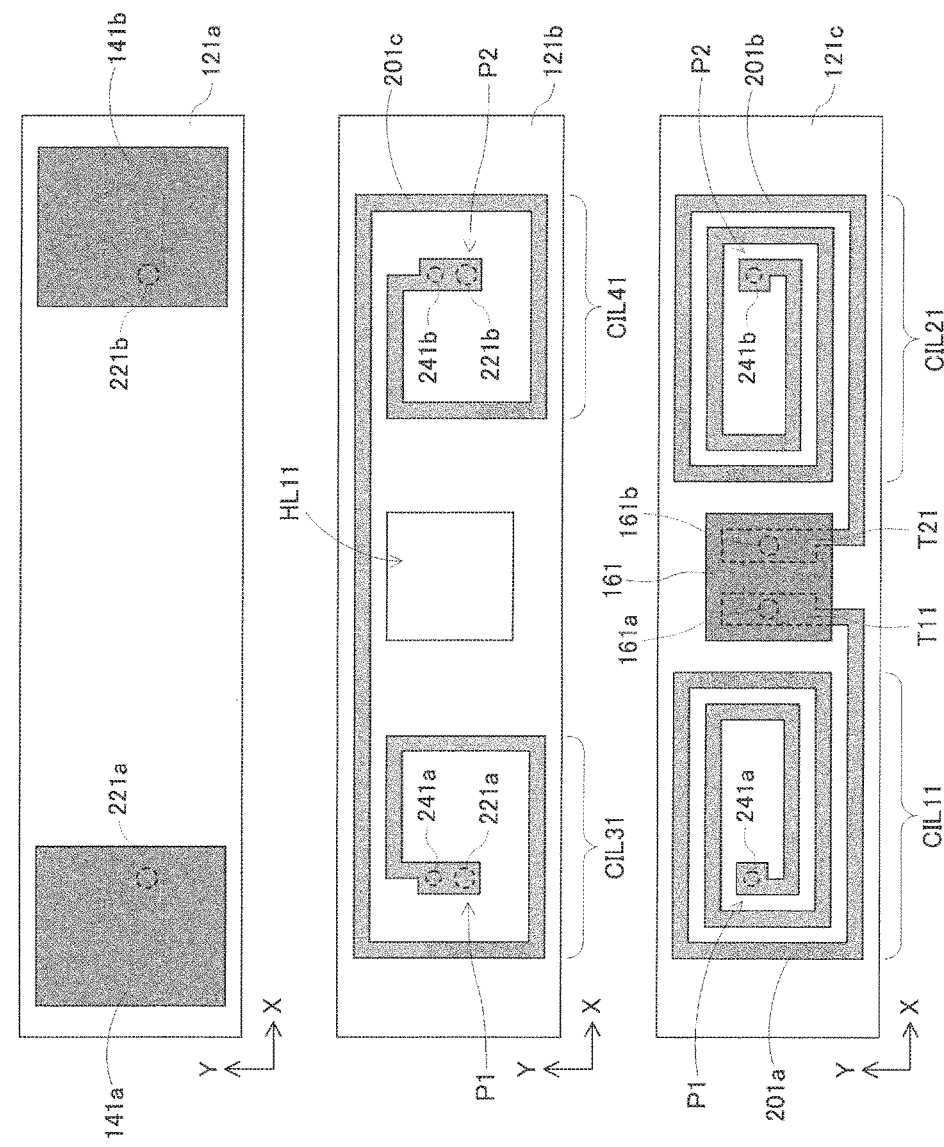

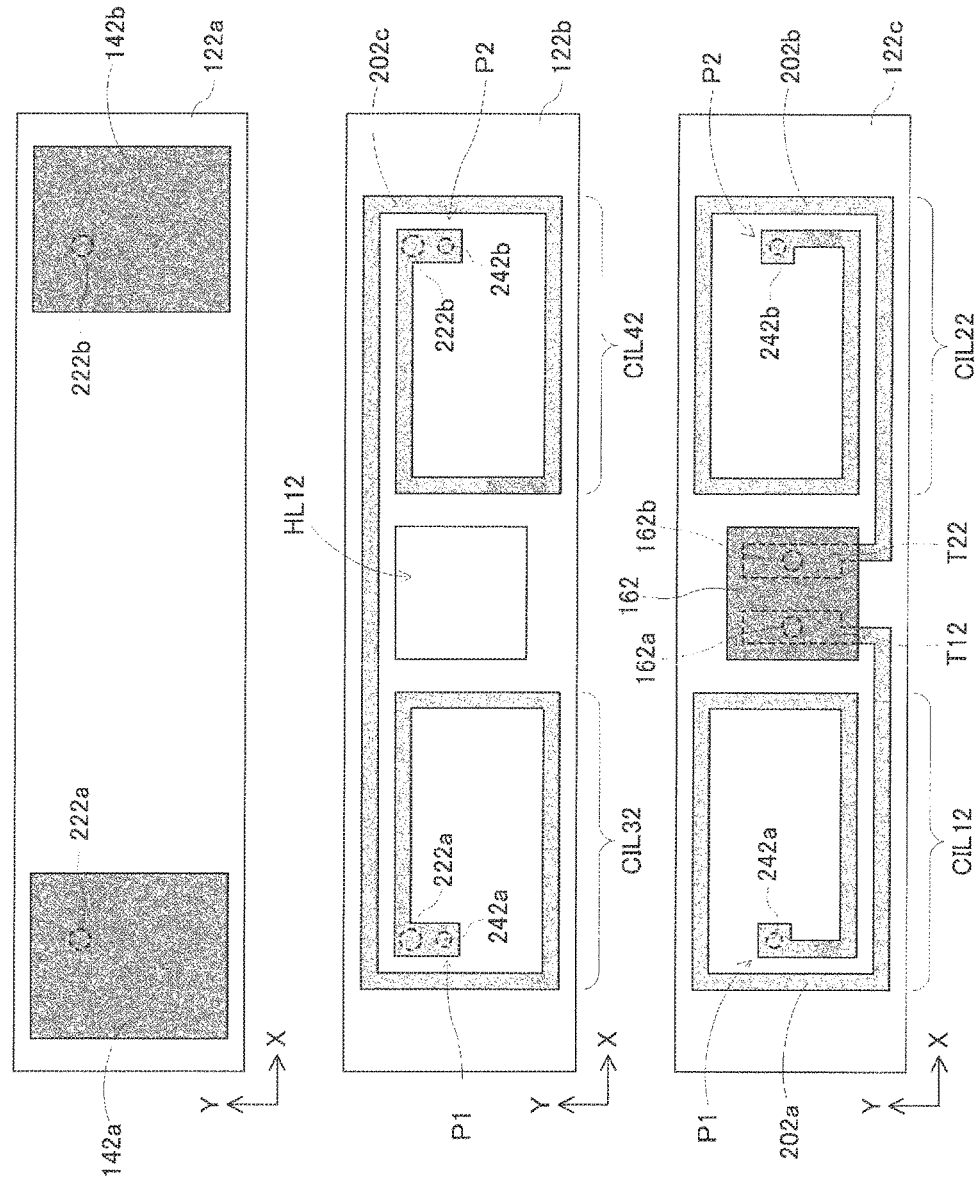

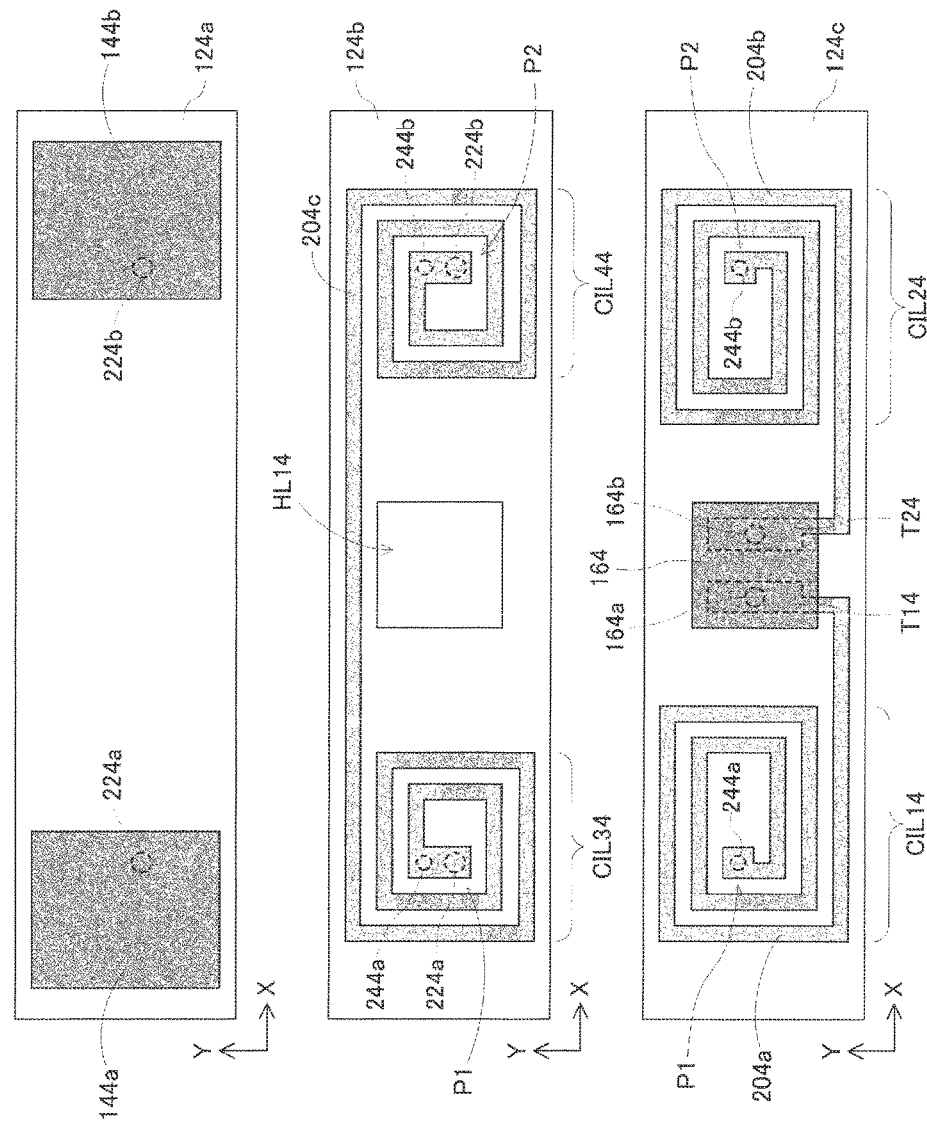

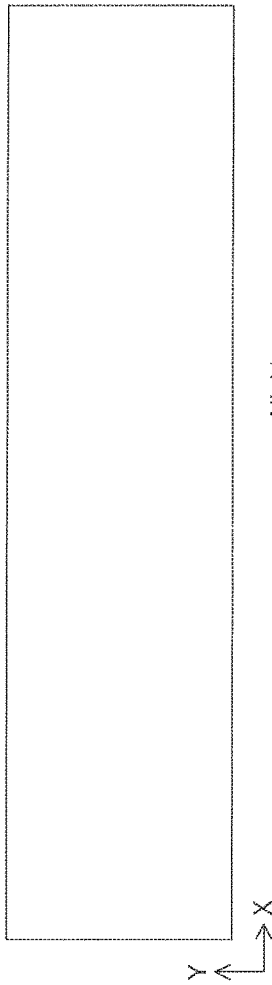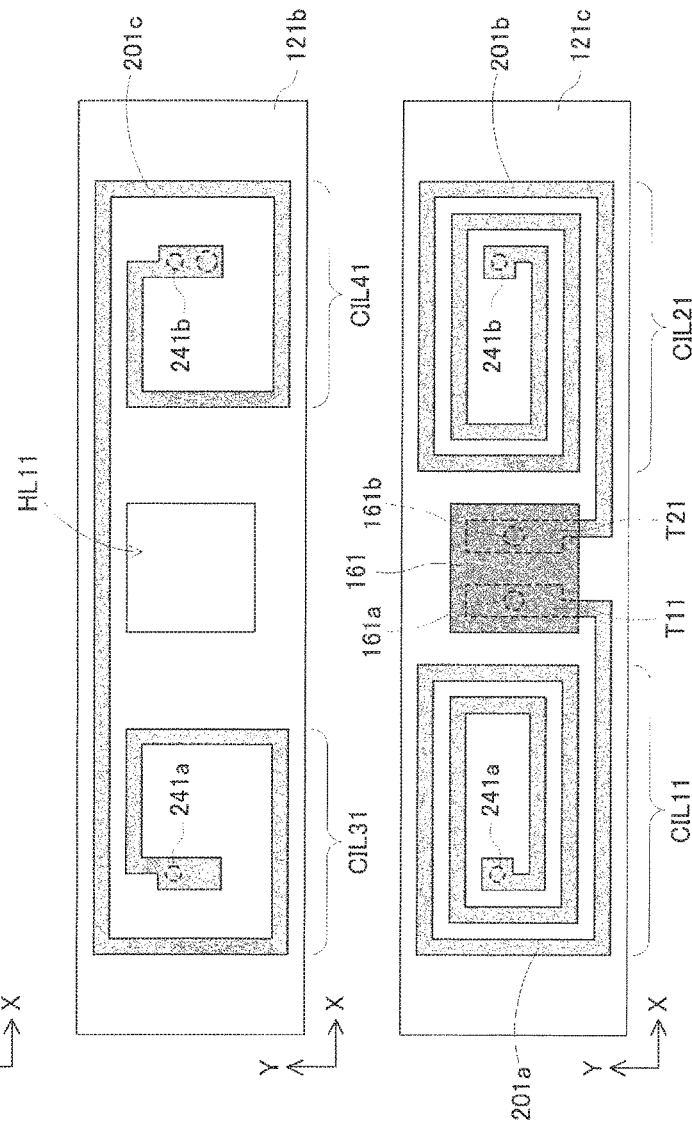
Fig.23A
Fig.23B
Fig.23C

RFIC MODULE AND RFID TAG INCLUDING THE SAME

CROSS REFERENCE TO RELATED APPLICATIONS

This application claims the benefit of priority to Japanese Patent Application No. 2014-239824 filed on Nov. 27, 2014 and Japanese Patent Application No. 2015-030318 filed on Feb. 19, 2015 and is a Continuation Application of PCT Application No. PCT/JP2015/082287 filed on Nov. 17, 2015. The entire contents of each application are hereby incorporated herein by reference.

BACKGROUND OF THE INVENTION

1. Field of the Invention

The present invention relates to an RFIC (Radio Frequency Integrated Circuit) module and an RFID (Radio Frequency IDentifier) tag including the same and, more particularly, to an RFIC module and an RFID tag including an RFIC chip that includes two input/output terminals and a coil conductor that includes two coil ends respectively connected to the two input/output terminals.

2. Description of the Related Art

For an article information management system, an RFID system has recently been used and the RFID system enables a reader/writer and an RFID tag applied to an article to communicate in a non-contact manner utilizing a magnetic field or an electromagnetic field so as to transmit predetermined information. This RFID tag includes an RFIC chip storing predetermined information and processing a predetermined radio signal and an antenna element (radiator) transmitting/receiving high-frequency signals and is affixed to various articles (or packing materials thereof) to be managed when used.

The RFID system is typically an HF band RFID system using the 13.56 MHz band or a UHF band RFID system using the 900 MHz band. Particularly, because of a comparatively long communication distance and an ability to read multiple tags together, the UHF band RFID system is considered as a promising system for article management. A tag having a structure disclosed in WO 2010/146944 is an example of a known UHF band RFID tag.

The RFID tag disclosed in WO 2010/146944 includes two coil conductors adjacently arranged in a ceramic multilayer substrate and a stray capacitance is easily provided between the two coil conductors. If the coil conductors are coupled via the stray capacitance, a resonance circuit defined by a stray capacitance component and the inductance components of the coil conductors is provided, so that a passband width may be narrowed.

SUMMARY OF THE INVENTION

Preferred embodiments of the present invention provide an RFIC module and an RFID tag including an RFIC module, which are capable of reducing the risk of narrowing the passband width.

An RFIC module according to a preferred embodiment of the present invention includes an RFIC chip mounted on a substrate and including a first input/output terminal and a second input/output terminal; a power feeding circuit built into the substrate and including a coil conductor including a first coil end and a second coil end respectively connected to the first input/output terminal and the second input/output terminal; a first terminal electrode disposed on a principal surface of the substrate and connected to a first position of the coil conductor; and a second terminal electrode disposed on the principal surface of the substrate and connected to a second position of the coil conductor, the coil conductor including a first coil portion and a second coil portion, the first coil portion being disposed in a section extending from the first coil end to the first position, the first coil portion including a first winding axis extending in a direction intersecting with the principal surface of the substrate, the second coil portion being disposed in a section extending from the second coil end to the second position, the second coil portion including a second winding axis extending in a direction intersecting with the principal surface of the substrate, the first coil portion, the second coil portion, the first winding axis, and the second winding axis being located at positions with the RFIC chip interposed therebetween in a planar view of the substrate.

For the first coil portion and the second coil portion, the RFIC chip defines and functions as a ground or a shield, so that the first coil portion and the second coil portion are not significantly magnetically or capacitively coupled to each other. This enables a reduction in the risk of narrowing the passband of communication signals.

Preferably, the RFIC chip is built into the substrate, and the power feeding circuit is disposed at a position overlapping with the RFIC chip when viewed in a direction perpendicular to a predetermined side surface of the substrate. This results in an increase in the shield effect due to the RFIC chip.

Preferably, the substrate is a flexible substrate with the principal surface having a rectangular or substantially rectangular shape, and the first coil portion and the second coil portion are respectively located on opposing end sides of the long sides of the rectangular or substantially rectangular shape. This produces a thin flexible large-area RFIC chip module.

Preferably, the first coil portion and the second coil portion are located at respective positions spaced away from the RFIC chip in a planar view of the substrate. This increases the shield effect due to the RFIC chip.

Preferably, the first coil portion and the second coil portion are connected and wound such that magnetic fields generated by the respective coil portions are in phase. As a result, the first coil portion and the second coil portion are not significantly coupled through the magnetic fields.

Preferably, in a planar view of the substrate, the first terminal electrode does not overlap with a center of a coil opening of the first coil portion and the second terminal electrode does not overlap with a center of a coil opening of the second coil portion. As a result, the magnetic field generated by the first coil portion and the second coil portion is not significantly disturbed by the first terminal electrode and the second terminal electrode.

Preferably, the coil conductor further includes a third coil portion and a fourth coil portion connected in series between the first position and the second position and respectively overlapping with the first coil portion and the second coil portion in a planar view of the substrate. The additional resonance produced by the parasitic capacitance between the first coil portion and the second coil portion is coupled to the resonance produced by the third coil portion and the fourth coil portion. As a result, broadband resonance frequency characteristics are achieved.

In a preferred embodiment of the present invention, the power feeding circuit further includes a first connection conductor extending in a thickness direction of the substrate at a position overlapping with the first terminal electrode in a planar view of the substrate to connect the first coil portion and the third coil portion in series and a second connection conductor extending in a thickness direction of the substrate at a position overlapping with the second terminal electrode in a planar view of the substrate to connect the second coil portion and the fourth coil portion in series. The first connection conductor and the second connection conductor are disposed in a rigid area of the substrate in the planar view. This prevents a reduction in the flexibility of the RFIC module.

In a preferred embodiment of the present invention, the first coil portion, the second coil portion, the third coil portion, and the fourth coil portion are connected and wound such that magnetic fields generated by the coil conductor are in phase among the first coil portion, the second coil portion, the third coil portion, and the fourth coil portion. This increases the magnetic field strength.

Preferably, the third coil portion and the fourth coil portion are disposed on a layer adjacent to a layer on which the first and second terminal electrodes are provided, and the first coil portion and the second coil portion are disposed on a layer that is adjacent to the layer on which the third coil portion and the fourth coil portion are disposed on the side opposite to the layer on which the first and second terminal electrodes are provided.

As a result, the first coil portion and the second coil portion are disposed at positions spaced further away from the first terminal electrode and the second terminal electrode as compared to the third coil portion and the fourth coil portion. Therefore, even if the inductance values of the first coil portion and the second coil portion are increased, the magnetic field generation by the first coil portion and the second coil portion is not significantly disturbed or altered by the first terminal electrode and the second terminal electrode.

More preferably, the inductance values of the first coil portion and the second coil portion are larger than the inductance values of the third coil portion and the fourth coil portion, respectively. Such a structure increases the significance of disposing the first coil portion and the second coil portion at positions spaced away from the first terminal electrode and the second terminal electrode.

An RFID tag according to a preferred embodiment of the present invention includes an RFIC module; and an antenna element connected to the RFIC module, the RFIC module including an RFIC chip mounted on a substrate and including a first input/output terminal and a second input/output terminal, a power feeding circuit built into the substrate and including a coil conductor including a first coil end and a second coil end respectively connected to the first input/output terminal and the second input/output terminal, a first terminal electrode disposed on a principal surface of the substrate and connected to a first position of the coil conductor, and a second terminal electrode disposed on the principal surface of the substrate and connected to a second position of the coil conductor, the coil conductor including a first coil portion and a second coil portion, the first coil portion being disposed in a section extending from the first coil end to the first position, the first coil portion including a first winding axis extending in a direction intersecting with the principal surface of the substrate, the second coil portion being disposed in a section extending from the second coil end to the second position, the second coil portion including a second winding axis extending in a direction intersecting with the principal surface of the substrate, the first coil portion and the second coil portion as well as the first winding axis and the second winding axis being located at positions with the RFIC chip interposed therebetween in a planar view of the substrate.

For the first coil portion and the second coil portion, the RFIC chip defines and functions as a ground or a shield, so that the first coil portion and the second coil portion are not significantly magnetically or capacitively coupled to each other. This enables a reduction in the risk of narrowing the passband of communication signals.

Preferably, the antenna element is a dipole type antenna element including a first antenna portion connected at one end to the first terminal electrode and a second antenna portion connected at one end to the second terminal electrode. As a result, the RFID tag is able to be easily produced.

Preferably, the antenna element preferably is a loop type antenna element including one end connected to the first terminal electrode and the other end connected to the second terminal electrode. As a result, the antenna characteristics are not significantly varied by the permittivity of an article to which the RFID tag is affixed.

An RFIC module according to a preferred embodiment of the present invention includes an RFIC chip mounted on a substrate and including a first input/output terminal and a second input/output terminal; and a power feeding circuit built into the substrate and including a coil conductor including a first coil end and a second coil end respectively connected to the first input/output terminal and the second input/output terminal, the coil conductor including a first coil portion and a second coil portion connected in series and located at positions with the RFIC chip interposed therebetween in a planar view of the substrate, the first coil portion and the second coil portion respectively including a first winding axis and a second winding axis with the RFIC chip interposed therebetween in a planar view of the substrate, the first winding axis and the second winding axis extending in a direction intersecting with the principal surface.

For the first coil portion and the second coil portion, the RFIC chip defines and functions as a ground or a shield, so that the first coil portion and the second coil portion are not significantly magnetically or capacitively coupled to each other. This enables a reduction in the risk of narrowing the passband of communication signals. The first coil portion and the second coil portion define and function as an antenna element and, therefore, a small-sized RFID tag is achieved.

Preferably, the coil conductor further includes a third coil portion and a fourth coil portion connected in series between the first coil portion and the second coil portion and respectively overlapping with the first coil portion and the second coil portion in a planar view of the substrate.

The additional resonance produced by the parasitic capacitance between the first coil portion and the second coil portion is coupled to the resonance produced by the third coil portion and the fourth coil portion. As a result, broadband resonance frequency characteristics are achieved.

According to various preferred embodiments of the present invention, the risk of narrowing the passband of communication signals is able to be reduced by enabling the RFIC chip to define and function as a ground or a shield.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 17A is a top view of an upper insulation layer of a multilayer substrate of an RFIC module according to a preferred embodiment of the present invention viewed from directly above, FIG. 17B is a top view of an intermediate insulation layer of the multilayer substrate of the RFIC module according to a preferred embodiment of the present invention viewed from directly above, and FIG. 17C is a top view of a lower insulation layer of the multilayer substrate of the RFIC module according to a preferred embodiment of the present invention viewed from directly above.

FIG. 18A is a top view of an upper insulation layer of a multilayer substrate of an RFIC module according to a preferred embodiment of the present invention viewed from directly above, FIG. 18B is a top view of an intermediate insulation layer of the multilayer substrate of the RFIC module according to a preferred embodiment of the present invention viewed from directly above, and FIG. 18C is a top view of a lower insulation layer of the multilayer substrate of the RFIC module according to a preferred embodiment of the present invention viewed from directly above.

FIG. 20A is a top view of an upper insulation layer of a multilayer substrate of an RFIC module according to a preferred embodiment of the present invention viewed from directly above, FIG. 20B is a top view of an intermediate insulation layer of the multilayer substrate of the RFIC module according to a preferred embodiment of the present invention viewed from directly above, and FIG. 20C a top view of a lower insulation layer of the multilayer substrate of the RFIC module according to a preferred embodiment of the present invention viewed from directly above.

FIG. 23A is a top view of an upper insulation layer of a multilayer substrate of an RFIC module according to a preferred embodiment of the present invention viewed from directly above, FIG. 23B is a top view of an intermediate insulation layer of the multilayer substrate of the RFIC module according to a preferred embodiment of the present invention viewed from directly above, and FIG. 23C is a top view of a lower insulation layer of the multilayer substrate of the RFIC module according to a preferred embodiment of the present invention viewed from directly above.

DETAILED DESCRIPTION OF THE PREFERRED EMBODIMENTS

First Preferred Embodiment

Figure 1:
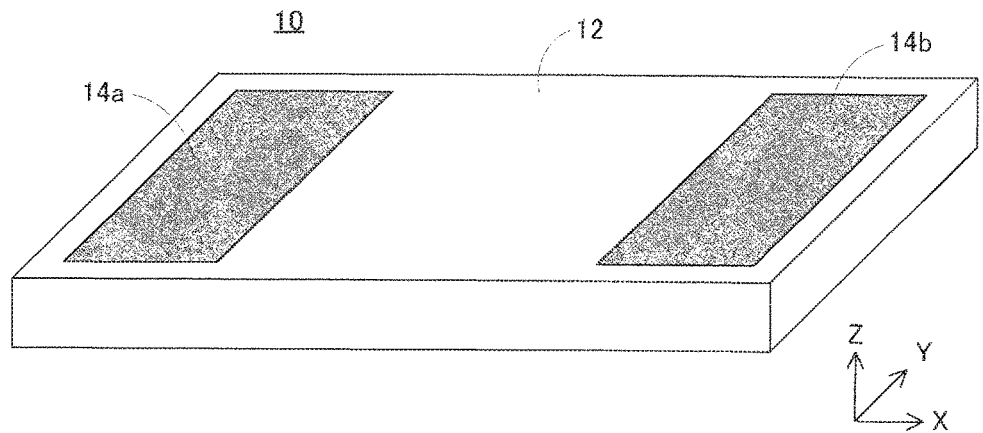
FIG. 1 is a perspective view of an RFID tag according to a preferred embodiment of the present invention viewed obliquely from above.

Referring to FIG. 1, an RFIC module 10 according to a preferred embodiment of the present invention is an RFIC module that utilizes a communication frequency of the 900 MHz band, i.e., the UHF band, and includes a multilayer substrate 12 with a principal surface preferably having a rectangular or substantially rectangular shape. The multilayer substrate 12 preferably includes a base body that is a laminated body formed by laminating flexible resin insulation layers of polyimide, liquid crystal polymer, or other suitable resins, for example, and the multilayer substrate itself exhibits flexibility. The insulation layers made of these materials include a permittivity smaller than that of ceramic base material layers made of LTCC.

In this preferred embodiment, the X-axis extends a longitudinal direction of the multilayer substrate 12, the Y-axis extends in a width direction of the multilayer substrate 12, and the Z-axis extends in a thickness direction of the multilayer substrate 12.

Further referring to FIGS. 3A to 3C, 4A to 4C, and 5A to 5C, an RFIC chip 16 and a power feeding circuit 18 are built into the multilayer substrate 12, and a first terminal electrode 14a and a second terminal electrode 14b are provided on one principal surface of the multilayer substrate 12.

Specifically, the RFIC chip 16 is preferably an ultrathin package, includes a structure in which various elements are built into a hard semiconductor substrate made of a semiconductor, such as silicon, for example, and includes the one principal surface and the other principal surface preferably having a square or substantially square shape. A first input/output terminal 16a and a second input/output terminal 16b are provided on the other principal surface of the RFIC chip 16 (described in detail later). The RFIC chip 16 is located at the center or the approximate center in each of the X-, Y-, and Z-axis directions inside the multilayer substrate 12 in a configuration in which the sides of the square or substantially square shape extend along the X-axis or the Y-axis and the one principal surface and the other principal surface face the positive side and the negative side, respectively, in the Z-axis direction.

The power feeding circuit 18 includes a coil conductor 20 and interlayer connection conductors 24a and 24b (described in detail later). The coil conductor 20 includes coil patterns 20a to 20c. A first coil portion CIL1 defines a portion of the coil pattern 20a, a second coil portion CIL2 defines a portion of the coil pattern 20b, and a third coil portion CIL3 and a fourth coil portion CIL4 define portions of the coil pattern 20c.

The first coil portion CIL1, the third coil portion CIL3, and the interlayer connection conductor 24a are arranged in the Z-axis direction at positions on the negative side in the X-axis direction, and the second coil portion CIL2, the fourth coil portion CIL4, and the interlayer connection conductor 24b are arranged in the Z-axis direction at positions on the positive side in the X-axis direction.

Based on this structure, the RFIC chip 16 is located between the first coil portion CIL1 and the second coil portion CIL2 and between the third coil portion CIL3 and the fourth coil portion CIL4 when the multilayer substrate 12 is viewed in each of the Z- and Y-axis directions.

The first terminal electrode 14a is disposed at a position on the negative side in the X-axis direction, and the second terminal electrode 14b is disposed at a position on the positive side in the X-axis direction. Both of the first terminal electrode 14a and the second terminal electrode 14b are preferably made of a flexible copper foil having a strip shape, for example, and the respective principal surface sizes are preferably the same or substantially the same as each other. The short sides of the strip extend along the X-axis, and the long sides of the strip extend along the Y-axis.

Therefore, in a planar view of the multilayer substrate 12 in the lamination direction of the insulation layers, the RFIC chip 16 is interposed between a portion of the power feeding circuit 18 and another portion of the power feeding circuit 18. When the multilayer substrate 12 is viewed in the X-axis direction, the RFIC chip 16 overlaps with the power feeding circuit 18. In the planar view of the multilayer substrate 12, the power feeding circuit 18 partially overlaps with each of the first and second terminal electrodes 14a, 14b.

Since each of the insulation layers of the laminated body is preferably in a range of about 10 µm to about 100 µm, for example, the RFIC chip 16 and the power feeding circuit 18 built into the multilayer substrate 12 can be seen through on the outside. Therefore, the connection state, i.e., the presence of a broken wire, of the RFIC chip 16 and the power feeding circuit 18 is able to be easily confirmed.

Referring to FIGS. 4A to 4C and 5A to 5C, the multilayer substrate 12 preferably includes three laminated sheet-shaped insulation layers 12a to 12c. Among these layers, the insulation layer 12a is an upper layer, the insulation layer 12b is an intermediate layer, and the insulation layer 12c is a lower layer.

The first terminal electrode 14a and the second terminal electrode 14b are provided on one principal surface of the insulation layer 12a. As described above, the first terminal electrode 14a is disposed on the negative side in the X-axis direction and the second terminal electrode 14b is disposed on the positive side in the X-axis direction.

At the center or approximate center of one principal surface of the insulation layer 12b, a rectangular or substantially rectangular through-hole HL1 is provided and extends to the other principal surface. The size of the through-hole HL1 is matched to the size of the RFIC chip 16. The coil pattern 20c preferably made of a flexible copper foil and extends in a belt shape is provided around the through-hole HL1 on the one principal surface of the insulation layer 12b.

One end of the coil pattern 20c is disposed at a position overlapping with the first terminal electrode 14a in the planar view and is connected to the first terminal electrode 14a by an interlayer connection conductor 22a extending in the Z-axis direction. The other end of the coil pattern 20c is disposed at a position overlapping with the second terminal electrode 14b in the planar view and is connected to the second terminal electrode 14b by an interlayer connection conductor 22b extending in the Z-axis direction. The interlayer connection conductors 22a, 22b and the interlayer connection conductors 24a, 24b, described later, are preferably hard metal masses containing Sn as a main component, for example.

Assuming that the one end of the coil pattern 20c is a starting end, preferably, the coil pattern 20c preferably winds around the one end twice in the counterclockwise direction, extends to near the end portion of the negative side in the Y-axis direction, and then extends into the positive side in the X-axis direction. The coil pattern 20c subsequently bends near the end portion of the positive side in the X-axis direction toward the positive side in the Y-axis direction and winds around the other end twice in the counterclockwise direction before extending to the other end.

The coil patterns 20a and 20b preferably made of a flexible copper foil and extending in a belt shape are provided on one principal surface of the insulation layer 12c. In a planar view of the insulation layers 12b and 12c, preferably, one end of the coil pattern 20a is disposed at a position on the negative side in the Y-axis direction as compared to the one end of the coil pattern 20c, and the other end of the coil pattern 20a (a first coil end T1) is disposed at a position overlapping with a corner on the negative side in the X-axis direction and the positive side in the Y-axis direction of the four corners of the rectangular or substantially rectangular shape defined by the through-hole HL1.

One end of the coil pattern 20b is disposed at a position on the negative side in the Y-axis direction as compared to the other end of the coil pattern 20c, and the other end of the coil pattern 20b (a second coil end T2) is disposed at a position overlapping with a corner on the positive side in the X-axis direction and the positive side in the Y-axis direction of the four corners of the rectangular or substantially rectangular defined by the through-hole HL1. Both of the first coil end T1 and the second coil end T2 are preferably rectangular or substantially rectangular in the planar view of the insulation layer 12c.

Assuming that the one end of the coil pattern 20a is a starting point, preferably, the coil pattern 20a preferably winds around the one end about 2.5 times in the clockwise direction and subsequently bends toward the negative side in the Y-axis direction to extend to the other end. Similarly, assuming that the one end of the coil pattern 20b is a starting point, preferably, the coil pattern 20b winds around the one end about 2.5 times in the counterclockwise direction and subsequently bends toward the negative side in the Y-axis direction to extend the other end. The one end of the coil pattern 20a is connected to the one end of the coil pattern 20c by the interlayer connection conductor 24a extending in the Z-axis direction, and the one end of the coil pattern 20b is connected to the other end of the coil pattern 20c by the interlayer connection conductor 24b extending in the Z-axis direction.

In the planar view of the insulation layers 12b and 12c, a section of the coil pattern 20a overlaps with a section of the coil pattern 20c, and a section of the coil pattern 20b overlaps with another section of the coil pattern 20c. The power feeding circuit 18 includes the coil patterns 20a to 20c arranged in this manner in addition to the interlayer connection conductors 24a and 24b.

In this preferred embodiment, between the overlapping sections of the coil patterns 20a and 20c, the section of the coil pattern 20a is defined as a "first coil portion CIL1" and the section of the coil pattern 20c is defined as a "third coil portion CIL3." Between the overlapping sections of the coil patterns 20b and 20c, the section of the coil pattern 20b is defined as a "second coil portion CIL2" and the section of the coil pattern 20c is defined as a "fourth coil portion CIL4." The position of the one end of the coil pattern 20a or the one end of the coil pattern 20c is defined as a "first position P1" and the position of the one end of the coil pattern 20b or the other end of the coil pattern 20c is defined as a "second position P2."

Rectangular or substantially rectangular dummy conductors 26a and 26b preferably made of flexible copper foil are also provided on the one principal surface of the insulation layer 12c. In the planar view of the insulation layers 12b and 12c, the dummy conductors 26a and 26b are disposed to overlap with two respective corners arranged in the X-axis direction on the negative side in the Y-axis direction of the four corners of the rectangular or substantially rectangular shape defined by the through-hole HL1.

The RFIC chip 16 is mounted on the insulation layer 12c such that the four corners of the other principal surface respectively face the first coil end T1, the second coil end T2, and the dummy conductors 26a, 26b. The first input/output terminal 16a is disposed on the other principal surface of the RFIC chip 16 to overlap with the first coil end T1 in the planar view. Similarly, the second input/output terminal 16b is disposed on the other principal surface of the RFIC chip 16 to overlap with the second coil end T2 in the planar view.

As a result, the RFIC chip 16 is connected to the first coil end T1 by the first input/output terminal 16a and is connected to the second coil end T2 by the second input/output terminal 16b.

Figure 2:
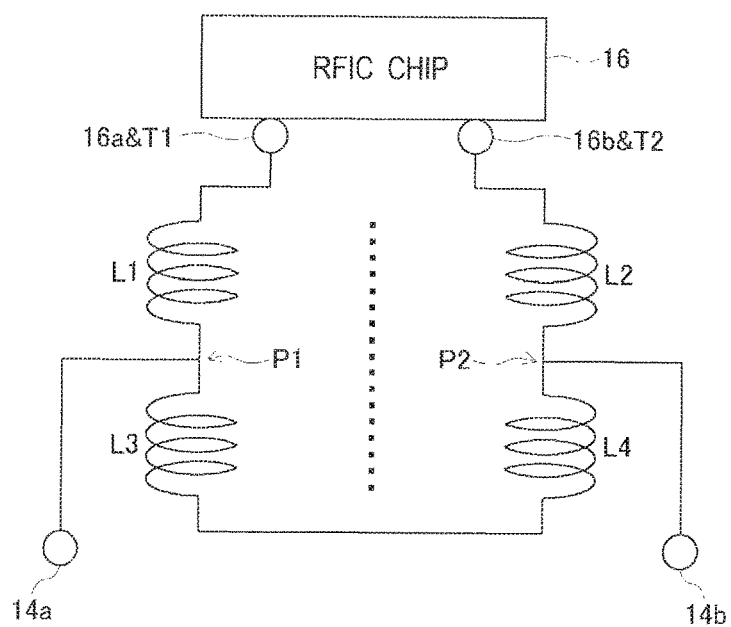
FIG. 2 is a circuit diagram of an equivalent circuit of the RFIC module.
Figure 3A:
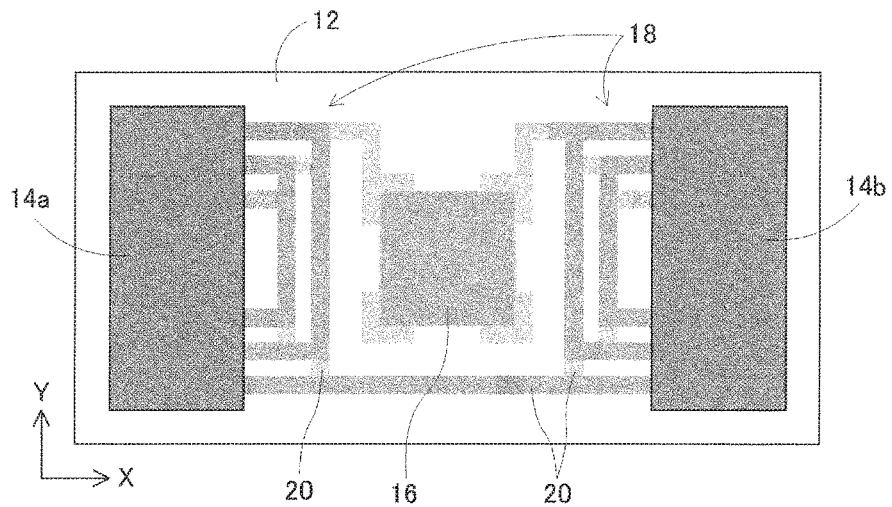
FIG. 3A is a top view of the RFIC module viewed from directly above.
Figure 3B:
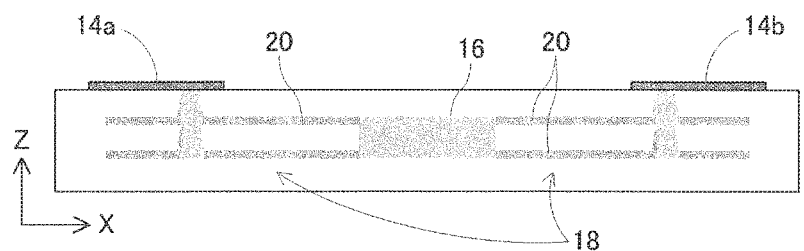
FIG. 3B is a side view of the RFIC module viewed from the side.
Figure 3C:
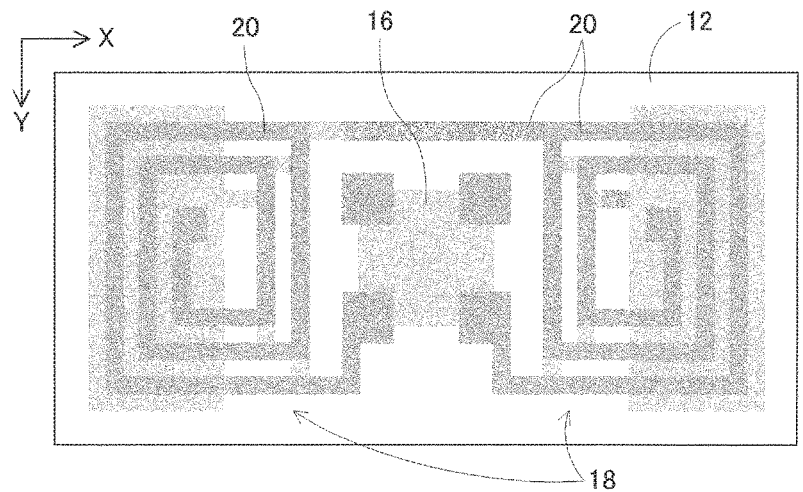
FIG. 3C is a bottom view of the RFIC module viewed from directly below.

An equivalent circuit of the RFIC element 100 configured in this way is shown in FIG. 2. An inductor L1 corresponds to the first coil portion CIL1, and an inductor L2 corresponds to the second coil portion CIL2. An inductor L3 corresponds to the third coil portion CIL3, and an inductor L4 corresponds to the fourth coil portion CIL4. The characteristics of impedance matching by the power feeding circuit 18 are specified by the values of the inductors L1 to L4.

One end of the inductor L1 and one end of the inductor L2 are connected to the first input/output terminal 16a and the second input/output terminal 16b, respectively, disposed on the RFIC chip 16. The other end of the inductor L1 is connected to one end of the inductor L3, and the other end of the inductor L2 is connected to one end of the inductor L4. The other end of the inductor L3 is connected to the other end of the inductor L4. The first terminal electrode 14a is connected to a connection point between the inductors L1 and L3, and the second terminal electrode 14b is connected to a connection point between the inductors L2 and L4.

Figure 6:
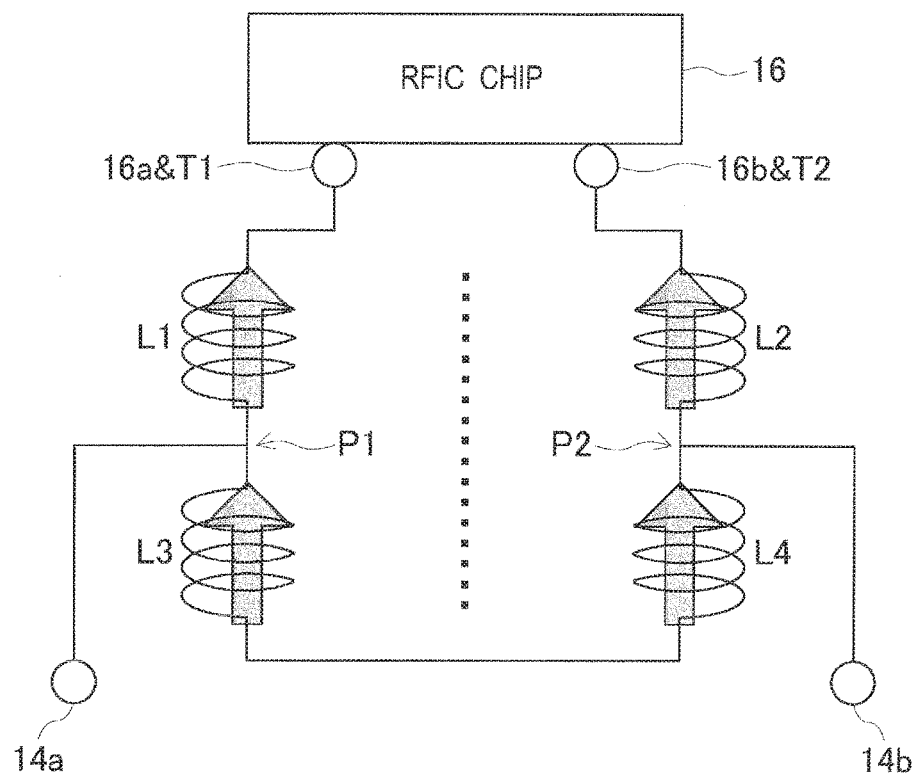
FIG. 6 is a schematic of an example of a state of a magnetic field occurring in the equivalent circuit.

Preferably, the first coil portion CIL1, the second coil portion CIL2, the third coil portion CIL3, and the fourth coil portion CIL4 are wound to produce magnetic fields in phase and are connected in series to each other. Therefore, the magnetic fields are generated toward a direction indicted by arrows of FIG. 6 at a certain point in time and are generated toward a direction opposite to the arrows at another point in time.

Figure 4A:
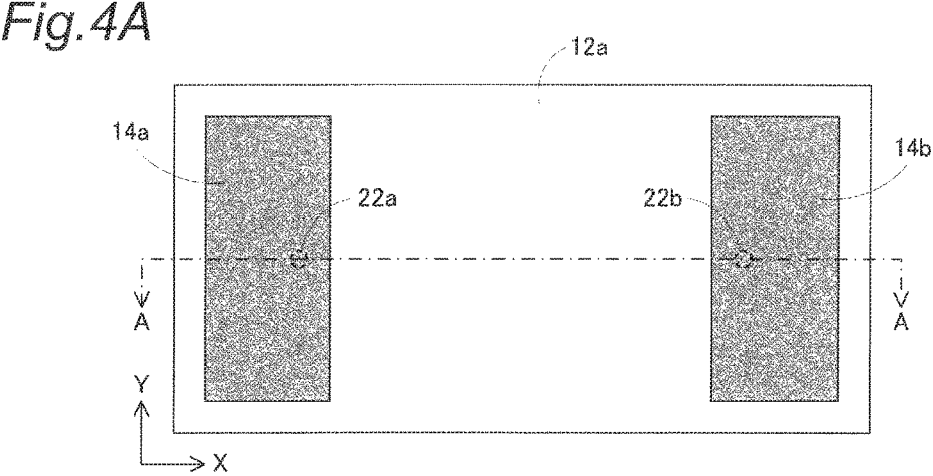
FIG. 4A is a top view of an upper insulation layer of a multilayer substrate of the RFIC module viewed from directly above.
Figure 4B:
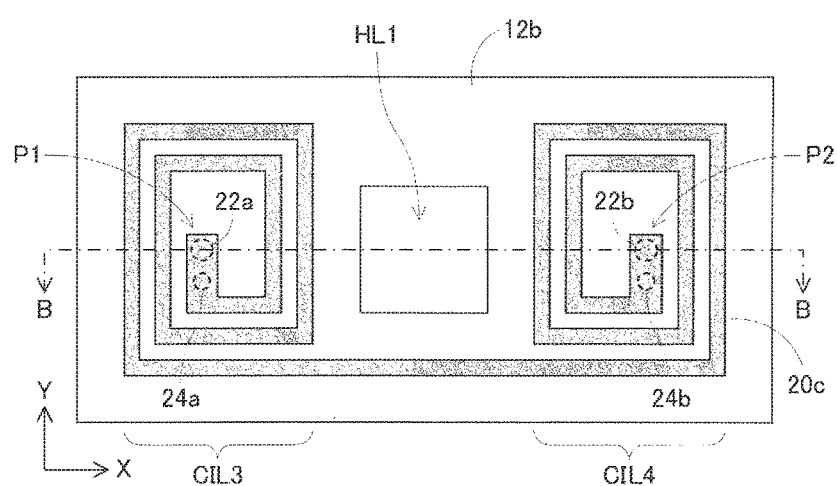
FIG. 4B is a top view of an intermediate insulation layer of the multilayer substrate of the RFIC module viewed from directly above.
Figure 4C:
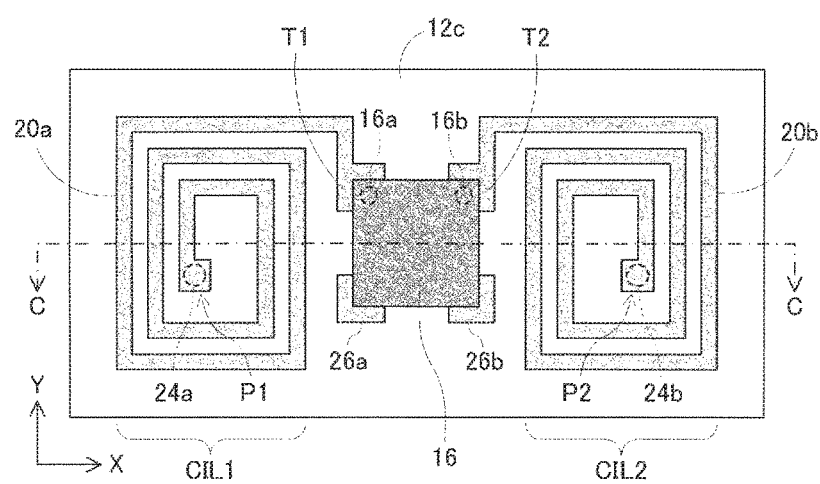
FIG. 4C is a bottom view of a lower insulation layer of the multilayer substrate of the RFIC module viewed from directly below.
Figure 5A:
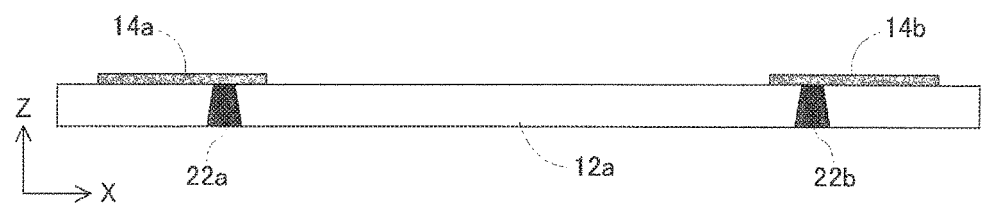
FIG. 5A is a cross-sectional view of the insulation layer shown in FIG. 4A taken along a cross section A-A.
Figure 5B:
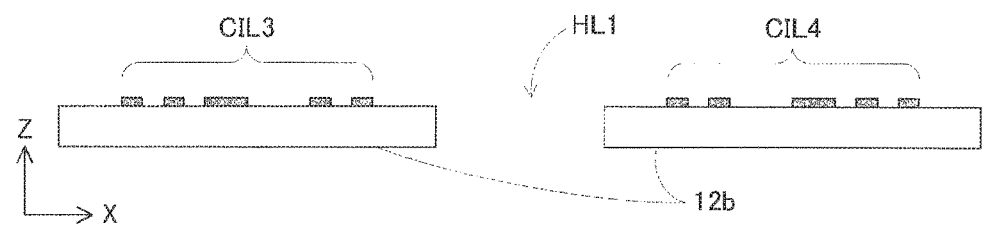
FIG. 5B is a cross-sectional view of the insulation layer shown in FIG. 4B taken along a cross section B-B.
Figure 5C:
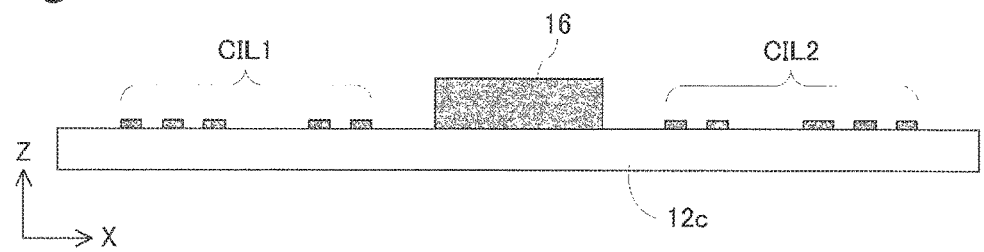
FIG. 5C is a cross-sectional view of the insulation layer shown in FIG. 4C taken along a cross section C-C.

As shown in FIGS. 4B and 4C, preferably, the first coil portion CIL1 and the third coil portion CIL3 include the same or substantially the same loop shape and the same or substantially the same first winding axis, and the second coil portion CIL2 and the fourth coil portion CIL4 include the same or substantially the same loop shape and the same or substantially the same second winding axis. The first winding axis and the second winding axis are disposed at positions such that the RFIC chip 16 is interposed therebetween.

Therefore, the first coil portion CIL1 and the third coil portion CIL3 are magnetically and capacitively coupled, and the second coil portion CIL2 and the fourth coil portion CIL4 are magnetically and capacitively coupled.

As described above, the RFIC chip 16 includes the first input/output terminal 16a and the second input/output terminal 16b and is built into the multilayer substrate 12. The power feeding circuit 18 includes the coil patterns 20a to 20c and is built into the multilayer substrate 12. Among these, the coil pattern 20a includes the other end (the first coil end T1) connected to the first input/output terminal 16a, and the coil pattern 20b includes the other end (the second coil end T2) connected to the second input/output terminal 16b. The first terminal electrode 14a and the second terminal electrode 14b are disposed on the one principal surface of the multilayer substrate 12 and are connected to the one end of the coil pattern 20a (the first position P1) and the one end of the coil pattern 20b (the second position P2), respectively.

The first coil portion CIL1 is disposed in a section extending from the first coil end T1 to the first position P1 and includes the first winding axis extending in the direction intersecting with the one principal surface of the multilayer substrate 12. The second coil portion CIL2 is disposed in a section extending from the second coil end T2 to the second position P2 and includes the second winding axis in the direction intersecting with the one principal surface of the multilayer substrate 12. The third coil portion CIL3 is disposed to overlap with the first coil portion CIL1 in the planar view and the fourth coil portion CIL4 is disposed to overlap with the second coil portion CIL2 in the planar view. The first coil portion CIL1/the third coil portion CIL3 and the second coil portion CIL2/the fourth coil portion CIL4 are disposed at positions such that the RFIC chip 16 is interposed therebetween in the planar view of the multilayer substrate 12.

While the power feeding circuit 18 that provides impedance matching is built into the multilayer substrate 12, the RFIC chip 16 is also built into the multilayer substrate 12, and the first coil portion CIL1/the third coil portion CIL3 and the second coil portion CIL2/the fourth coil portion CIL4 are disposed at positions such that the RFIC chip 16 is interposed therebetween in the planar view of the multilayer substrate 12.

Since the RFIC chip 16 preferably includes the semiconductor substrate, the RFIC chip 16 defines and functions as a ground or a shield for the first coil portion CIL1, the second coil portion CIL2, the third coil portion CIL3, and the fourth coil portion CIL4, so that the first coil portion CIL1 and the second coil portion CIL2 are not significantly magnetically or capacitively coupled to each other, and such that the third coil portion CIL3 and the fourth coil portion CIL4 are not significantly magnetically or capacitively coupled to each other. This reduces the risk of narrowing the passband of communication signals.

Second Preferred Embodiment

Figures 7A, 7B:
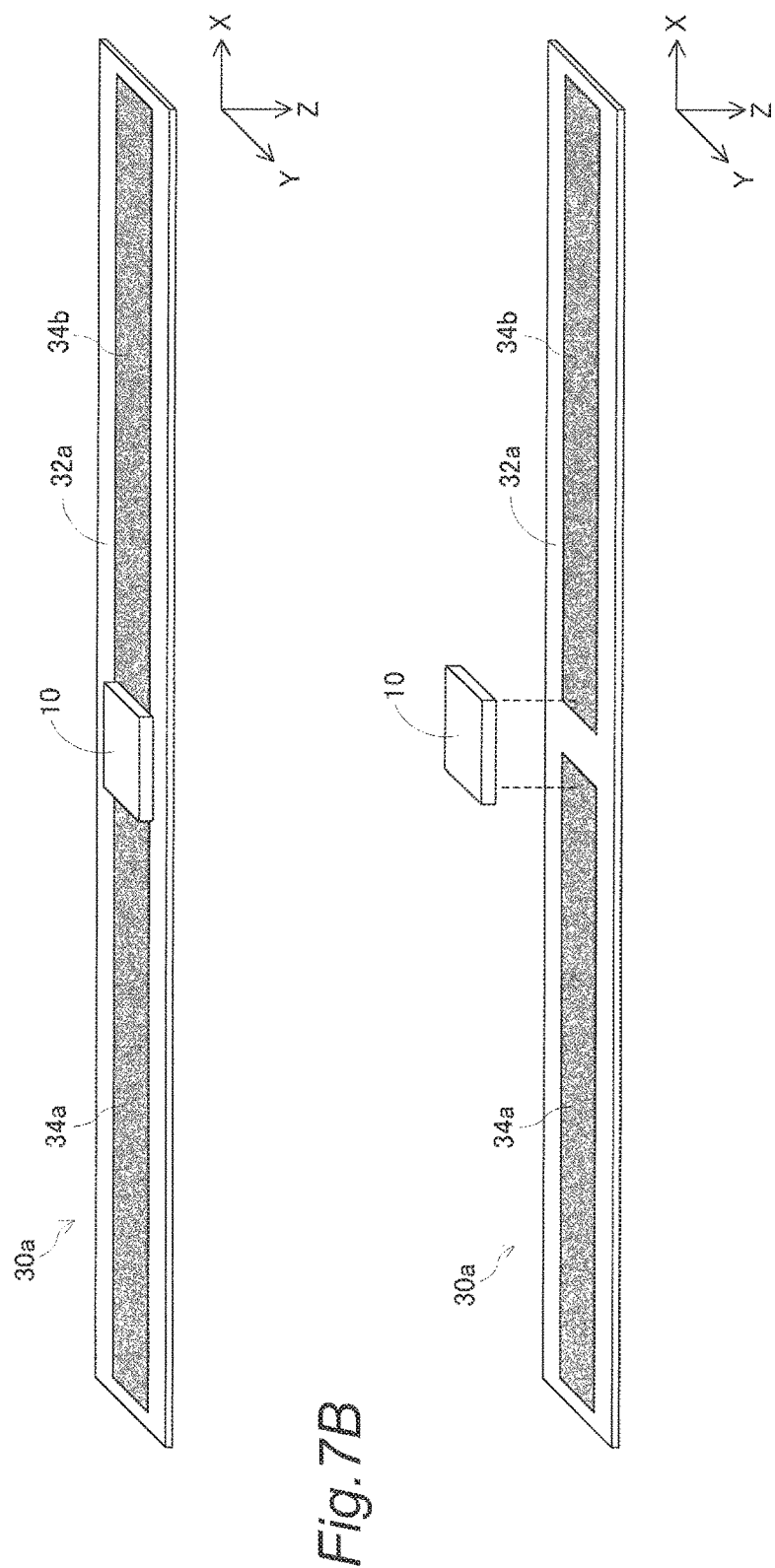
FIG. 7A is a perspective view of an RFID device according to a preferred embodiment of the present invention viewed obliquely from above and FIG. 7B is an exploded perspective view of the RFID device according to a preferred embodiment of the present invention viewed obliquely from above.

An example of an RFID tag including the RFIC module 10 according to a second preferred embodiment of the present invention mounted thereon is shown in FIGS. 7A and 7B. This RFID tag is preferably a dipole type RFID tag, for example, and an antenna element 30a includes an antenna base material 32a and antenna conductors 34a, 34b disposed thereon.

The antenna base material 32a is preferably a belt-shaped flexible base material made of PET, for example. Each of the antenna conductors 34a and 34b is preferably a belt-shaped flexible conductor made of aluminum foil or copper foil, for example. The antenna conductors 34a and 34b include a common width and length. Preferably, the width of each of the antenna conductors 34a and 34b is less than the width of the antenna base material 32a, and the length of each of the antenna conductors 34a and 34b is less than a half of the length of the antenna base material 32a.

The antenna conductors 34a and 34b are disposed on a surface of the antenna base material 32a (a surface facing toward the negative side in the Z-axis direction). Specifically, the antenna conductor 34a is disposed on a region of the surface of the antenna base material 32a on the negative side in the X-axis direction and extends in the longitudinal direction of the antenna base material 32a. Similarly, the antenna conductor 34b is disposed on a region of the surface of the antenna base material 32a on the positive side in the X-axis direction and extends in the longitudinal direction of the antenna base material 32a.

An interval between one end of the antenna conductor 34a (an end portion on the positive side in the X-axis direction) and one end of the antenna conductor 34b (an end portion on the negative side in the X-axis direction) is matched to an interval between the first terminal electrode 14a and the second terminal electrode 14b disposed on the RFIC module 10.

The RFIC module 10 is mounted on the surface of the antenna base material 32a at a center or an approximate center position with one principal surface thereof facing the surface of the antenna base material 32a. As a result, the first terminal electrode 14a is connected to the one end of the antenna conductor 34a, and the second terminal electrode 14b is connected to the one end of the antenna conductor 34b.

Figure 9:
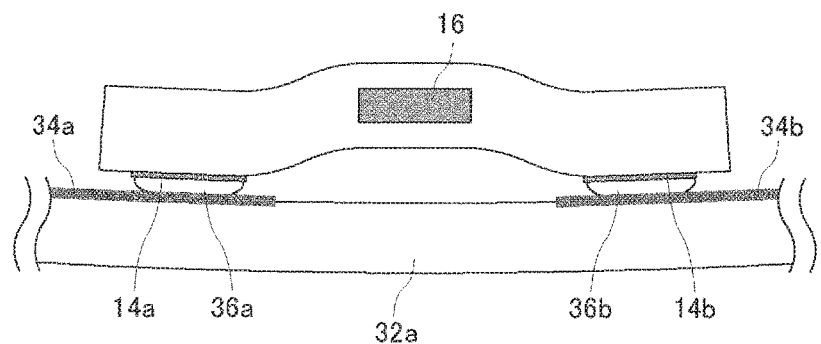
FIG. 9 is a schematic view of a bent state of the RFIC module mounted on an element antenna element.

Preferably, the first terminal electrode 14a is fixed to the antenna conductor 34a by a conductive bonding material 36a, and the second terminal electrode 14b is fixed to the antenna conductor 34b by a conductive bonding material 36b (see FIG. 9). Instead of the conductive bonding materials 36a and 36b, an insulation bonding material may be used to provide a capacitive connection. As such, the first terminal electrode 14a and the second terminal electrode 14b may electrically be connected to the antenna conductors 34a and 34b.

As described above, preferably, the multilayer substrate 12 is made of flexible polyimide or liquid crystal polymer, for example, and the coil patterns 20a to 20c, the first terminal electrode 14a, and the second terminal electrode 14b are made of flexible copper foil, for example. On the other hand, the interlayer connection conductors 22a, 22b, 24a, 24b are preferably hard conductors made of Sn, for example, and the substrate of the RFIC chip 16 is preferably also a hard substrate made of silicon, for example. The first and second terminal electrodes 14a, 14b including a large area reduce the flexibility of the copper foil, and the flexibility is eliminated by applying a plating film of Ni/Au or Ni/Sn, for example.

Figure 8:
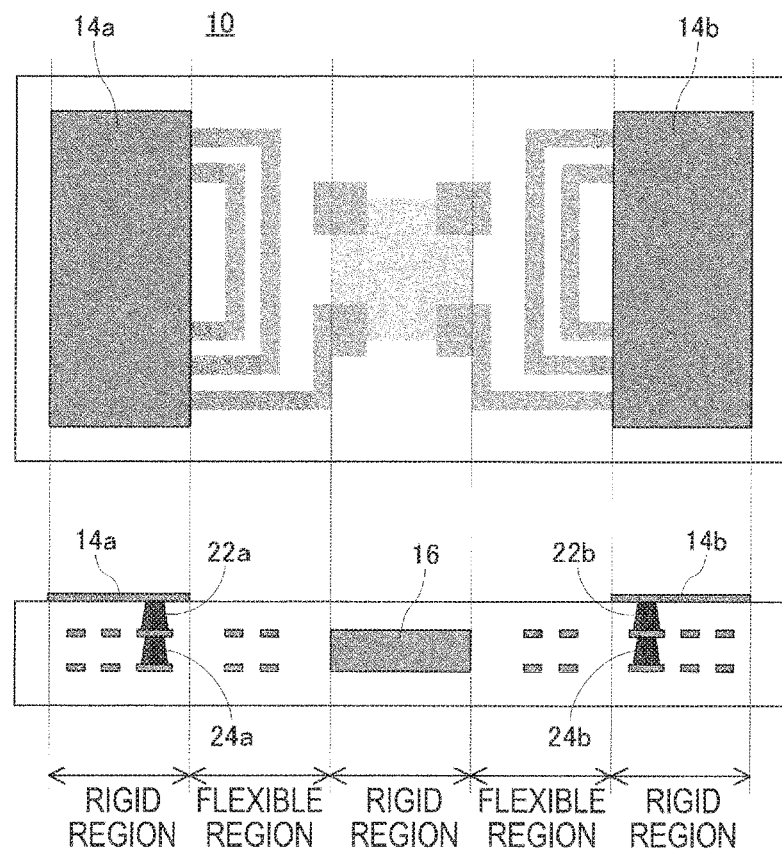
FIG. 8 is a schematic view of the distribution of rigid and flexible regions in the RFIC module.

As a result, rigid regions and flexible regions are provided in the RFIC module 10 as shown in FIG. 8. According to FIG. 8, the respective regions disposed with the first terminal electrode 14a, the second terminal electrode 14b, and the RFIC chip are define as the rigid regions, and the other regions are defined as the flexible regions. Particularly, since the first terminal electrode 14a and the second terminal electrode 14b are each disposed at a position spaced away from the RFIC chip 16 in a planar view, the flexible regions are provided between the first terminal electrode 14a and the RFIC chip 16 and between the second terminal electrode 14b and the RFIC chip 16. The interlayer connection conductors 22a, 22b, 24a, 24b are disposed in the rigid regions.

Therefore, when the RFID tag is affixed to a curved surface, the RFIC module 10 is bent as shown in FIG. 9, for example.

Figure 10:
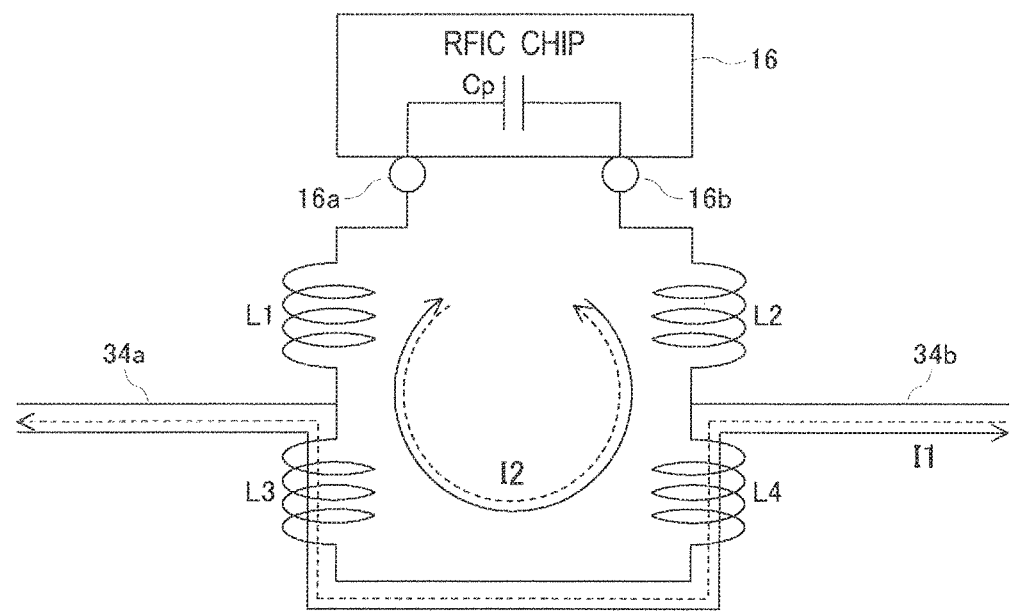
FIG. 10 is a schematic view of an example of a state of a current flowing through the equivalent circuit.

Referring to FIG. 10, the RFIC chip 16 itself includes a parasitic capacitance (stray capacitance) Cp produced between the first input/output terminal 16a and the second input/output terminal 16b, and two resonances are generated in the RFIC module 10. The first resonance is the resonance generated in a current path including the antenna conductors 34a, 34b, the inductor L3, and the inductor L4, and the second resonance is the resonance generated in a current path (current loop) including the inductors L1 to L4 and the parasitic capacitance Cp. These two resonances are coupled by the inductors L3 to L4 shared by the current paths, and two respective currents I1 and I2 corresponding to the two resonances flow in a manner as shown in FIG. 10.

Figure 11:
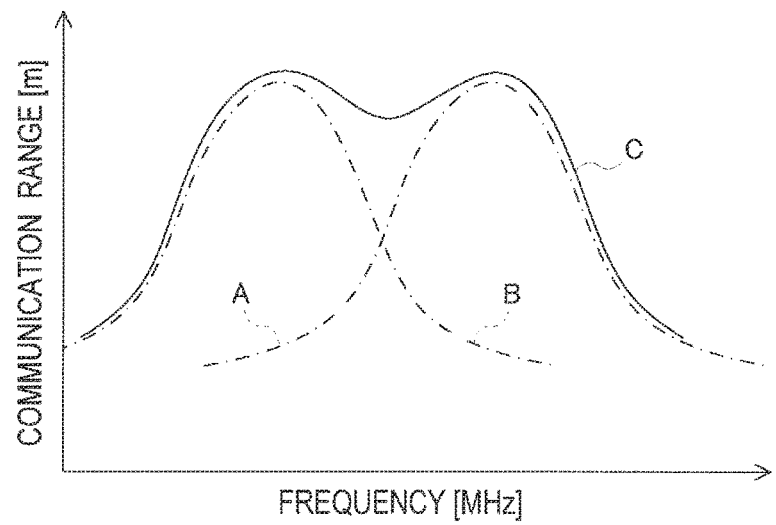
FIG. 11 is a graph showing an example of frequency characteristics of an RFID device.

Both of a first resonance frequency and a second resonance frequency are affected by the inductors L3 to L4. A difference of several dozen MHz, preferably about 5 MHz to about 50 MHz, for example, is generated between the first resonance frequency and the second resonance frequency. The resonance frequency characteristics thereof are represented by curves A and B in FIG. 11. By combining the two resonances including such resonance frequencies, broadband resonance frequency characteristics are produced as indicated by a curve C in FIG. 11.

Third Preferred Embodiment

Figure 12:
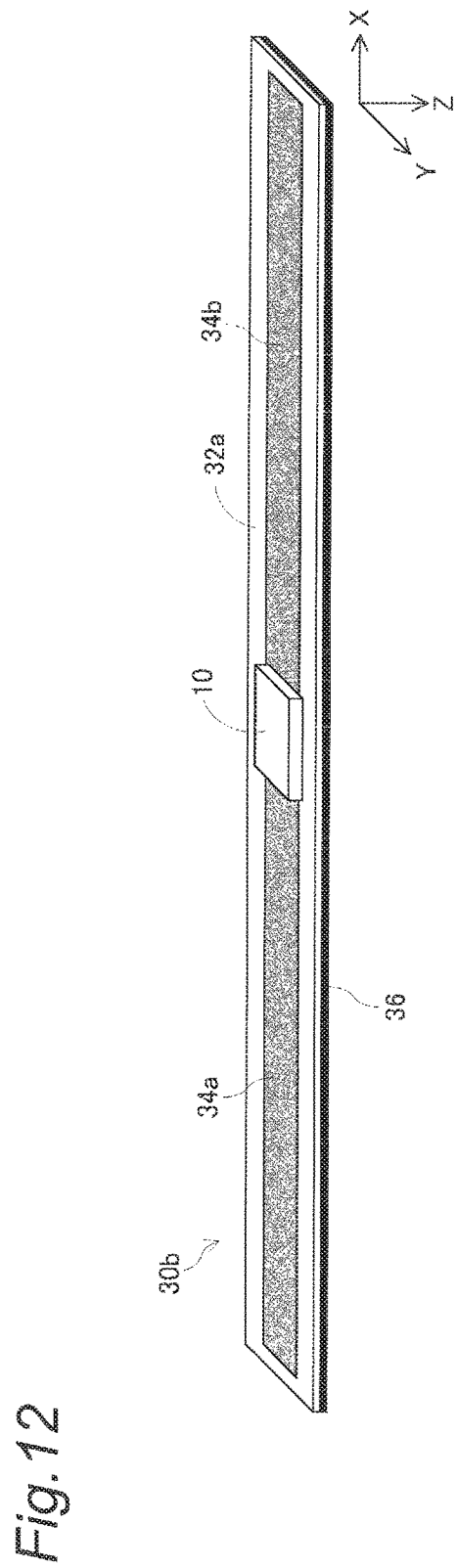
FIG. 12 is a perspective view of an RFID device according to a preferred embodiment of the present invention viewed obliquely from above.

Another example of an RFID tag including the RFIC module according to a third preferred embodiment of the present invention mounted thereon is shown in FIG. 12. This RFID tag is the same as or similar to the RFID tag shown in FIGS. 7A to 7B except that a magnet 36 is provided on the back surface of the antenna base material 32a (the surface facing toward the positive side in the Z-axis direction). As a result, the RFID tag is able to be easily affixed to an object made of metal.

Fourth Preferred Embodiment

Figure 13A:
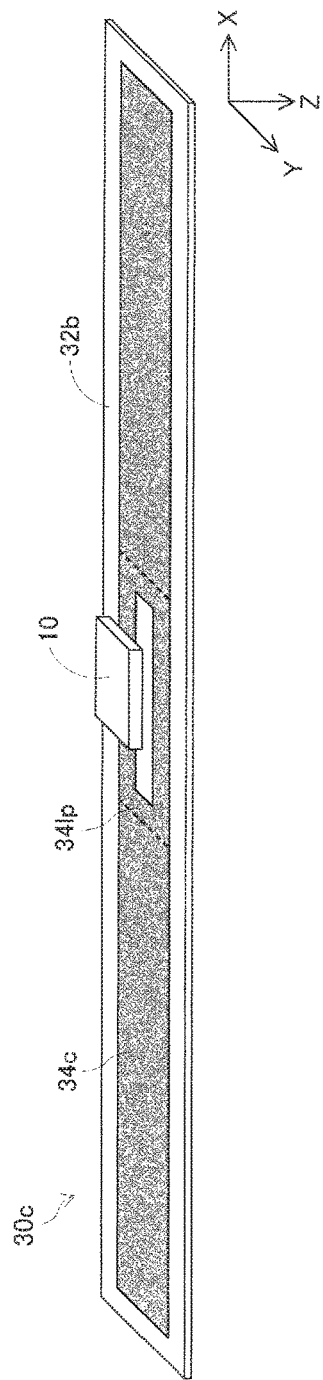
FIG. 13A is a perspective view of an RFID device according to a preferred embodiment of the present invention viewed obliquely from above and FIG. 13B is an exploded perspective view of the RFID device according to a preferred embodiment of the present invention viewed obliquely from above.
Figure 13B:
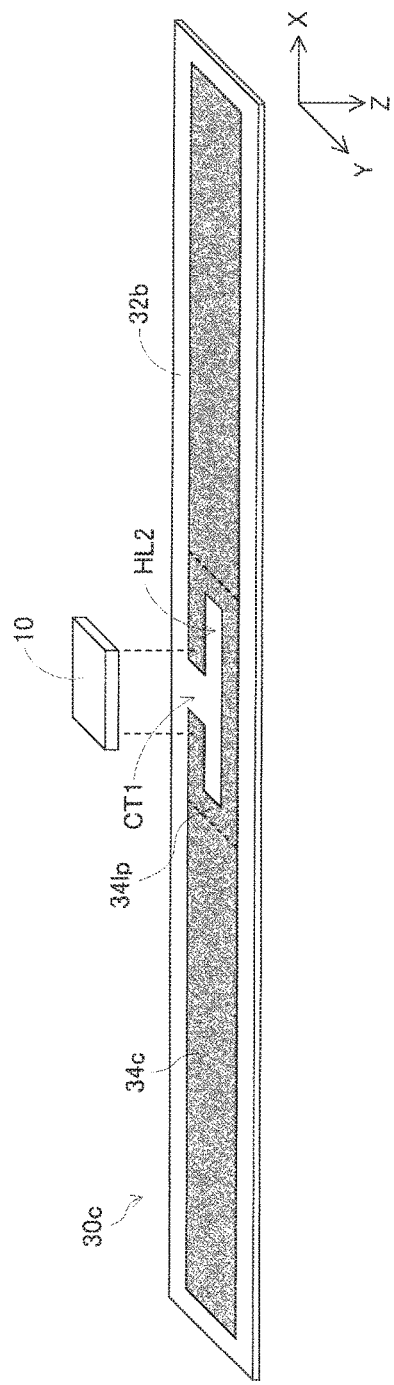

Yet another example of an RFID tag including the RFIC module 10 according to a fourth preferred embodiment of the present invention mounted thereon is shown in FIGS. 13A to 13B. According to FIGS. 13A to 13B, an antenna element 30c includes an antenna base material 32b and an antenna conductor 34c disposed thereon. Similarly, the antenna base material 32b is preferably a belt-shaped flexible base material made of PET, for example, and the antenna conductor 34c is preferably a belt-shaped flexible conductor made of aluminum foil or copper foil, for example.

However, at the center or the approximate center in the longitudinal direction of a belt of the antenna conductor 34c, a rectangular or substantially rectangular through-hole HL2 is disposed with long sides extending along the belt, and a cutout CT1 is disposed from an outer edge of the belt to the through-hole HL2. The length of the through-hole HL2 is preferably greater than the length of the RFIC module 10, while the length of the cutout CT1 is preferably less than the length of the RFIC module 10. By forming the through-hole HL2 and the cutout CT1, a portion of the conductor around the through-hole HL2 defines and functions as a loop conductor 341p that provides impedance matching.

The RFIC module 10 is mounted at a position covering the cutout CT1 with one principal surface thereof facing the surface of the antenna base material 32b. As a result, the first terminal electrode 14a is connected to one end of the loop conductor 341p, and the second terminal electrode 14b is connected to the other end of the loop conductor 341p.

Fifth Preferred Embodiment

Figure 14:
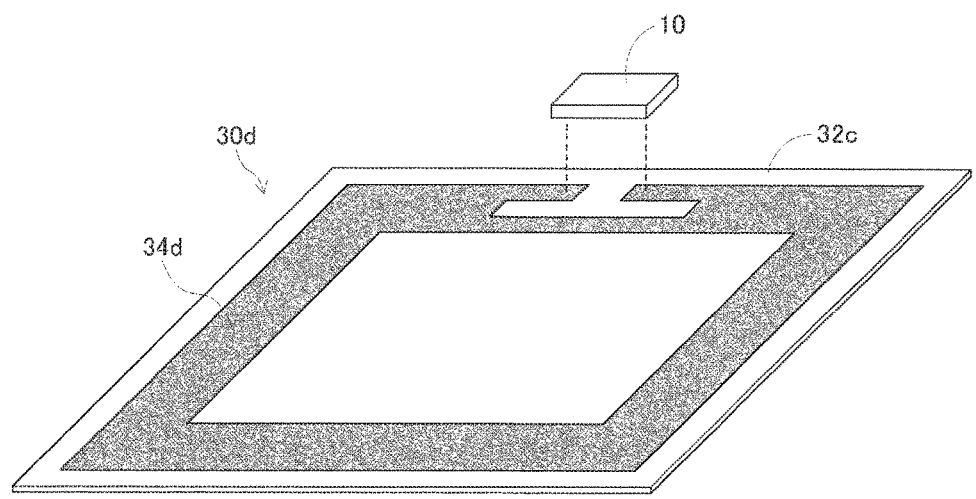
FIG. 14 is a perspective view of an RFID device according to a preferred embodiment of the present invention viewed obliquely from above.

A further example of an RFID tag including the RFIC module according to a fifth preferred embodiment of the present invention mounted thereon is shown in FIG. 14. According to FIG. 14, an antenna element 30d preferably includes a square or substantially square antenna base material 32c and an antenna conductor 34d disposed thereon. The antenna conductor 34d is defined by coupling the antenna conductors 34c shown in FIGS. 13A to 13B into a loop shape. As a result, the antenna conductor 34d defines and functions as a loop antenna.

Sixth Preferred Embodiment

Figure 15:
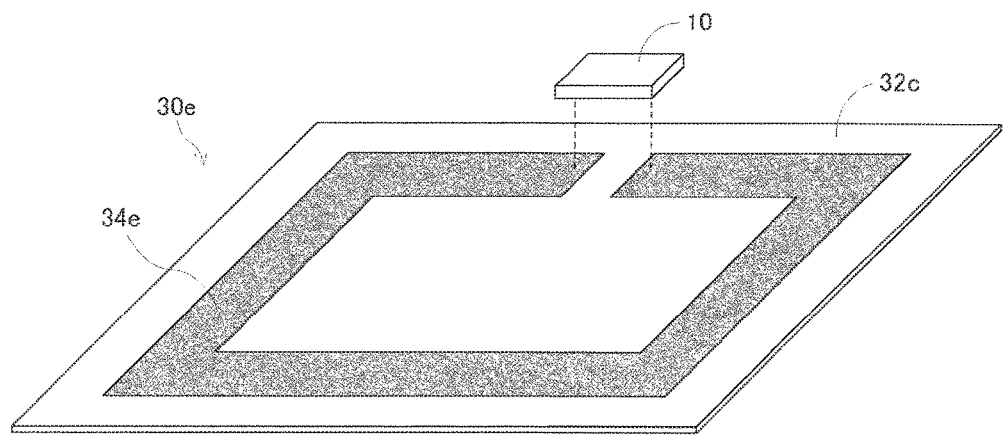
FIG. 15 is a perspective view of an RFID device according to a preferred embodiment of the present invention viewed obliquely from above.

Another example of an RFID tag including the RFIC module according to a sixth preferred embodiment of the present invention mounted thereon is shown in FIG. 15. According to FIG. 15, an antenna element 30e preferably includes a square or substantially square antenna base material 32c and an antenna conductor 34e disposed thereon. The antenna conductor 34e is defined by coupling the antenna conductors 34a and 34b shown in FIGS. 7A to 7B into a loop shape. As a result, the antenna conductor 34e also defines and functions as a loop antenna.

Figure 16:
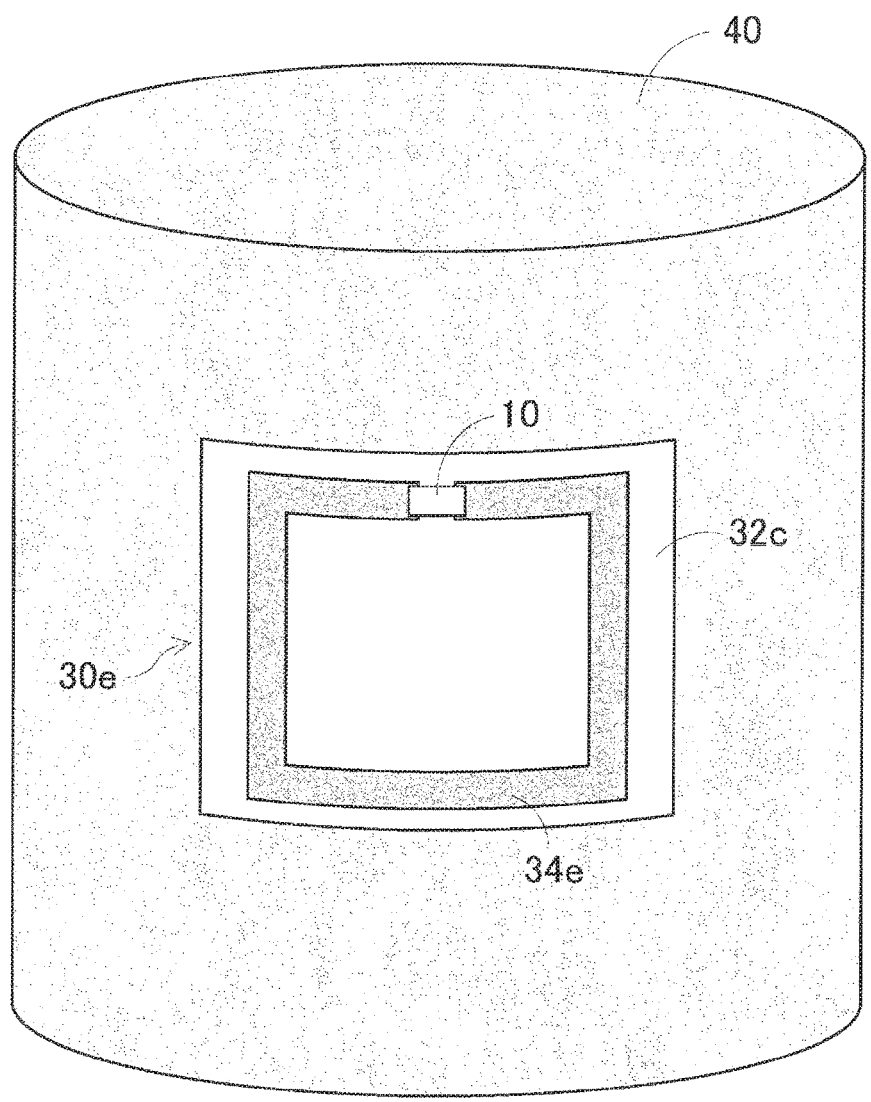
FIG. 16 is a perspective view of the RFID device shown in FIG. 15 mounted on a cylindrical article.

The RFID tag shown in FIG. 14 or 15 is preferably attached to a cylindrical article 40 in a manner shown in FIG. 16. The article 40 may be a PET bottle or a flexible pack for drip infusion, for example, and FIG. 16 shows an attached state of the RFID tag shown in FIG. 15. Unlike a dipole antenna, a loop antenna includes no open end. Therefore, the antenna characteristics are not adversely affected by the permittivity of an object to which the antenna is affixed, i.e., the article 40.

Seventh Preferred Embodiment

Another example of the multilayer substrate 12 of the RFIC module 10 according to a seventh preferred embodiment of the present invention is shown in FIGS. 17A to 17C. The main differences from the multilayer substrate 12 shown in FIGS. 4A to 4C are in the respective winding directions of a first coil portion CIL11 and a second coil portion CIL21, the respective winding numbers and winding directions of third coil portions CIL31 and CIL41, a positional relationship in a planar view between the center or the approximate center of the opening of the first coil portion CIL11 and a first terminal electrode 141a, and the positional relationship in a planar view between the center or the approximate center of the opening of the second coil portion CIL21 and a second terminal electrode 141b.

According to FIGS. 17A to 17C, the multilayer substrate preferably includes three laminated sheet-shaped insulation layers 121a to 121c. Among these layers, the insulation layer 121a is an upper layer, the insulation layer 121b is an intermediate layer, and the insulation layer 121c is a lower layer.

The first terminal electrode 141a and the second terminal electrode 141b are provided on one principal surface of the insulation layer 121a. The first terminal electrode 141a is disposed on the negative side in the X-axis direction and the second terminal electrode 141b is disposed on the positive side in the X-axis direction.

At the center or the approximate center position of one principal surface of the insulation layer 121b, a rectangular or substantially rectangular through-hole HL11 is provided, which extends to the other principal surface. The size of the through-hole HL11 is matched to the size of an RFIC chip 161. A coil pattern 201c preferably made of flexible copper foil and extending in a belt shape, for example, is provided around the through-hole HL11 on the one principal surface of the insulation layer 121b.

One end of the coil pattern 201c is disposed at a position overlapping with the first terminal electrode 141a in the planar view and is connected to the first terminal electrode 141a by an interlayer connection conductor 221a extending in the Z-axis direction. The other end of the coil pattern 201c is disposed at a position overlapping with the second terminal electrode 141b in the planar view and is connected to the second terminal electrode 141b by an interlayer connection conductor 221b extending in the Z-axis direction. The interlayer connection conductors 221a, 221b and interlayer connection conductors 241a, 241b described later are preferably hard metal masses containing Sn as a main component, for example.

Assuming that the one end of the coil pattern 201c is a starting end, the coil pattern 201c preferably winds around the one end once in the clockwise direction, extends to near the end portion of the positive side in the Y-axis direction, and then extends into the positive side in the X-axis direction. The coil pattern 201c subsequently bends near the end portion of the positive side in the X-axis direction toward the negative side in the Y-axis direction and winds around the other end once in the clockwise direction before extending to the other end.

Coil patterns 201a and 201b preferably made of flexible copper foil and extending in a belt shape, for example, are provided on one principal surface of the insulation layer 121c. In a planar view of the insulation layers 121b and 121c, one end of the coil pattern 201a is disposed at a position on the positive side in the Y-axis direction as compared to the one end of the coil pattern 201c, and the other end of the coil pattern 201a (a first coil end T11) is disposed at a position on the negative side in the X-axis direction inside a rectangular or substantially rectangular shape defined by the through-hole HL11.

One end of the coil pattern 201b is disposed at a position on the positive side in the Y-axis direction as compared to the other end of the coil pattern 201c, and the other end of the coil pattern 201b (a second coil end T21) is disposed at a position on the positive side in the X-axis direction inside the rectangular or substantially rectangular shape defined by the through-hole HL11. Both of the first coil end T11 and the second coil end T21 preferably have a rectangular or substantially rectangular shape with the long sides extending in the Y-axis direction in the planar view of the insulation layer 121c.

Assuming that the one end of the coil pattern 201a is a starting point, the coil pattern 201a preferably winds around the one end about 2.5 times in the counterclockwise direction and subsequently bends toward the positive side in the Y-axis direction to reach the other end. Similarly, assuming that the one end of the coil pattern 201b is a starting point, the coil pattern 201b preferably winds around the one end about 2.5 times in the clockwise direction and subsequently bends toward the positive side in the Y-axis direction to extend the other end. The one end of the coil pattern 201a is connected to the one end of the coil pattern 201c by the interlayer connection conductor 241a extending in the Z-axis direction, and the one end of the coil pattern 201b is connected to the other end of the coil pattern 201c by the interlayer connection conductor 241b extending in the Z-axis direction.

The power feeding circuit 18 includes the coil patterns 201a to 201c and the interlayer connection conductors 241a and 241b arranged in this manner. In this case, a conductor portion of the coil pattern 201a except the first coil end T11 is defined as the "first coil portion CIL11" and a conductor portion of the coil pattern 201b except the second coil end T21 is defined as the "second coil portion CIL21." A conductor portion of the coil pattern 201c on the negative side in the X-axis direction relative to the through-hole HL11 is defined as the "third coil portion CIL31" and a conductor portion of the coil pattern 201c on the positive side in the X-axis direction relative to the through-hole HL11 is defined as the "fourth coil portion CIL41."

The position of the one end of the coil pattern 201a or the one end of the coil pattern 201c corresponds to the "first position P1" and the position of the one end of the coil pattern 201b or the other end of the coil pattern 201c corresponds to the "second position P2."

A first input/output terminal 161a and a second input/output terminal 161b are disposed on the other principal surface of the RFIC chip 161. Specifically, the first input/output terminal 161a is located on the negative side in the X-axis direction, and the second input/output terminal 161b is located on the positive side in the X-axis direction. The RFIC chip 161 is mounted on the one principal surface of the insulation layer 121c such that the first input/output terminal 161a and the second input/output terminal 161b arranged in this manner are connected to the first coil end T11 and the second coil end T21.

The distance from the first terminal electrode 141a to the first coil portion CIL11 is preferably greater than the distance from the first terminal electrode 141a to the third coil portion CIL31, and the distance from the second terminal electrode 141b to the second coil portion CIL21 is preferably greater than the distance from the second terminal electrode 141b to the fourth coil portion CIL41.

Based on this arrangement, in the multilayer substrate 12, the winding number of the first coil portion CIL11 is greater than the winding number of the third coil portion CIL31, and the winding number of the second coil portion CIL21 is greater than the winding number of the fourth coil portion CIL41. In other words, the inductance value of the first coil portion CIL11 is greater than the inductance value of the third coil portion CIL31, and the inductance value of the second coil portion CIL21 is greater than the inductance value of the fourth coil portion CIL41.

When viewed in the Z-axis direction, the first terminal electrode 141a does not overlap with the respective opening centers of the first coil portion CIL11 and the third coil portion CIL31, and the second terminal electrode 141b does not overlap with the respective opening centers of the second coil portion CIL21 and the fourth coil portion CIL41.

This configuration reduces the risk of the first terminal electrode 141a disturbing the magnetic field generation by the first coil portion CIL11 and the third coil portion CIL31, and also reduces the risk of the second terminal electrode 141b disturbing the magnetic field generation by the second coil portion CIL21 and the fourth coil portion CIL41.

The risk of disturbing the magnetic field generation is further reduced by completely eliminating the overlap of the respective openings of the first coil portion CIL11 and the third coil portion CIL31 with the first terminal electrode 141a and by completely eliminating the overlap of the respective openings of the second coil portion CIL21 and the fourth coil portion CIL41 with the second terminal electrode 141b.

Eighth Preferred Embodiment

Yet another example of the multilayer substrate 12 of the RFIC module 10 according to an eighth preferred embodiment of the present invention is shown in FIGS. 18A to 18C. The main differences from the multilayer substrate 12 shown in FIGS. 17A to 17C are in the respective winding numbers and opening areas of a first coil portion CIL12 and a second coil portion CIL22, the respective opening areas of a third coil portion CIL32 and a fourth coil portion CIL42, and the arrangement of the interlayer connection conductors 221a to 221b, 241a to 241b.

According to FIGS. 18A to 18C, the multilayer substrate preferably includes three laminated sheet-shaped insulation layers 122a to 122c. Among these layers, the insulation layer 122a is an upper layer, the insulation layer 122b is an intermediate layer, and the insulation layer 122c is a lower layer.

A first terminal electrode 142a and a second terminal electrode 142b are provided on one principal surface of the insulation layer 122a. The first terminal electrode 142a is disposed on the negative side in the X-axis direction and the second terminal electrode 142b is disposed on the positive side in the X-axis direction.

At the center or the approximate center position of one principal surface of the insulation layer 122b, a rectangular or substantially rectangular through-hole HL12 is preferably provided, and extends the other principal surface. The size of the through-hole HL12 is matched to the size of an RFIC chip 162. A coil pattern 202c preferably made of flexible copper foil and extending in a belt shape, for example, is provided around the through-hole HL12 on the one principal surface of the insulation layer 122b.

One end of the coil pattern 202c is disposed at a position overlapping with the first terminal electrode 142a in the planar view and is connected to the first terminal electrode 142a by an interlayer connection conductor 222a extending in the Z-axis direction. The other end of the coil pattern 202c is disposed at a position overlapping with the second terminal electrode 142b in the planar view and is connected to the second terminal electrode 142b by an interlayer connection conductor 222b extending in the Z-axis direction. The interlayer connection conductors 222a, 222b and interlayer connection conductors 242a, 242b described later are preferably hard metal masses containing Sn as a main component, for example.

Assuming that the one end of the coil pattern 202c is a starting end, the coil pattern 202c preferably winds around the one end once in the clockwise direction, extends to near the end portion of the positive side in the Y-axis direction, and then extends into the positive side in the X-axis direction. The coil pattern 202c subsequently bends near the end portion of the positive side in the X-axis direction toward the negative side in the Y-axis direction and winds around the other end once in the clockwise direction before extending to the other end.

Coil patterns 202a and 202b preferably made of flexible copper foil and extending in a belt shape, for example, are provided on one principal surface of the insulation layer 122c. In a planar view of the insulation layers 122b and 122c, one end of the coil pattern 202a is disposed at a position overlapping with the one end of the coil pattern 202c, and the other end of the coil pattern 202a (a first coil end T12) is disposed at a position on the negative side in the X-axis direction inside a rectangular or substantially rectangular shape defined by the through-hole HL12.

One end of the coil pattern 202b is disposed at a position overlapping with the other end of the coil pattern 202c, and the other end of the coil pattern 202b (a second coil end T22) is disposed at a position on the positive side in the X-axis direction inside the rectangular or substantially rectangular shape defined by the through-hole HL12. Both the first coil end T12 and the second coil end T22 define a rectangle or a substantial rectangle with the long sides extending in the Y-axis direction in the planar view of the insulation layer 122c.

Assuming that the one end of the coil pattern 202a is a starting point, the coil pattern 202a preferably winds around the one end about 1.5 times in the counterclockwise direction and subsequently bends toward the positive side in the Y-axis direction to reach the other end. Similarly, assuming that the one end of the coil pattern 202b is a starting point, the coil pattern 202b preferably winds around the one end about 1.5 times in the clockwise direction and subsequently bends toward the positive side in the Y-axis direction to reach the other end. The one end of the coil pattern 202a is connected to the one end of the coil pattern 202c by the interlayer connection conductor 242a extending in the Z-axis direction, and the one end of the coil pattern 202b is connected to the other end of the coil pattern 202c by the interlayer connection conductor 242b extending in the Z-axis direction.

The power feeding circuit 18 includes the coil patterns 202a to 202c and the interlayer connection conductors 242a and 242b arranged in this manner. In this case, a conductor portion of the coil pattern 202a except the first coil end T12 is defined as the "first coil portion CIL12" and a conductor portion of the coil pattern 202b except the second coil end T22 is defined as the "second coil portion CIL22." A conductor portion of the coil pattern 202c on the negative side in the X-axis direction relative to the through-hole HL12 is defined as the "third coil portion CIL32" and a conductor portion of the coil pattern 202c on the positive side in the X-axis direction relative to the through-hole HL12 is defined as the "fourth coil portion CIL42."

The position of the one end of the coil pattern 202a or the one end of the coil pattern 202c corresponds to the "first position P1" and the position of the one end of the coil pattern 202b or the other end of the coil pattern 202c corresponds to the "second position P2."

A first input/output terminal 162a and a second input/output terminal 162b are disposed on the other principal surface of the RFIC chip 162. Specifically, the first input/output terminal 162a is located on the negative side in the X-axis direction, and the second input/output terminal 162b is located on the positive side in the X-axis direction. The RFIC chip 162 is mounted on the one principal surface of the insulation layer 122c such that the first input/output terminal 162a and the second input/output terminal 162b arranged in this manner are connected to the first coil end T12 and the second coil end T22.

In this multilayer substrate 12, the opening area and the opening center of the third coil portion CIL32 are preferably identical or substantially identical to the opening area and the opening center of the first coil portion CIL12. Similarly, the opening area and the opening center of the fourth coil portion CIL42 are preferably identical or substantially identical to the opening area and the opening center of the second coil portion CIL22.

When viewed in the Z-axis direction, preferably the opening center of the first coil portion CIL12 and the opening center of the third coil portion CIL32 do not overlap with the first terminal electrode 142a and, similarly, the opening center of the second coil portion CIL22 and the opening center of the fourth coil portion CIL42 do not overlap with the second terminal electrode 142b.

As a result, the magnetic field produced by the first coil portion CIL12 and the third coil portion CIL32 becomes stable and, similarly, the magnetic field produced by the second coil portion CIL22 and the fourth coil portion CIL42 becomes stable.

Ninth Preferred Embodiment

Figure 19A:
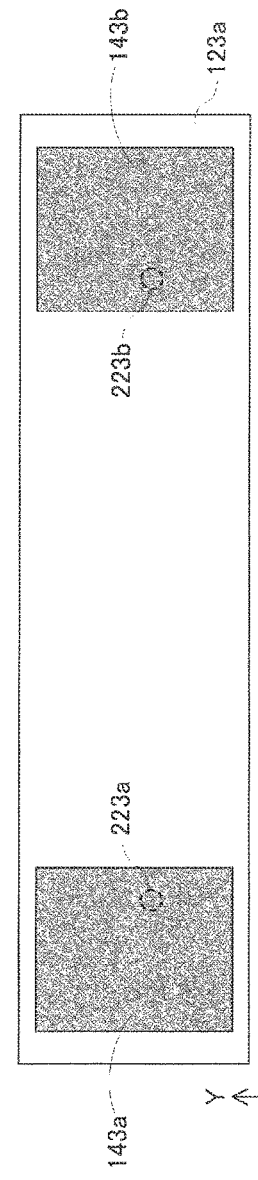
FIG. 19A is a top view of an upper insulation layer of a multilayer substrate of an RFIC module according to a preferred embodiment of the present invention viewed from directly above.
Figure 19B:
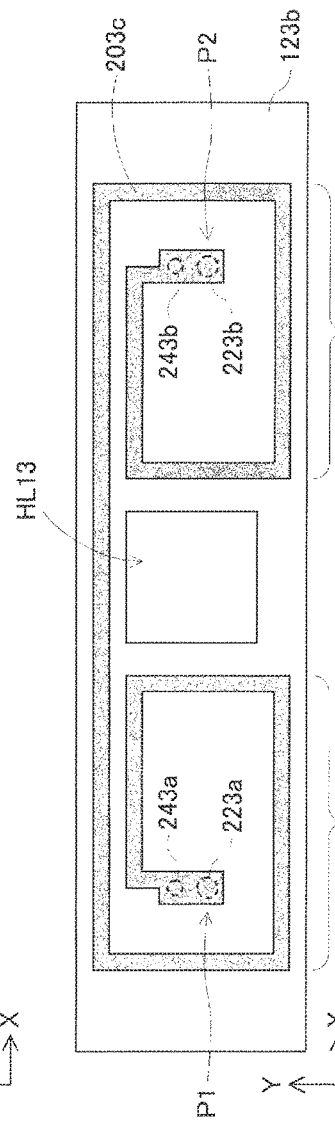
FIG. 19B is a top view of an intermediate insulation layer of the multilayer substrate of the RFIC module according to a preferred embodiment of the present invention viewed from directly above, and FIG. 19C a top view of a lower insulation layer of the multilayer substrate of the RFIC module according to a preferred embodiment of the present invention viewed from directly above.
Figure 19C:
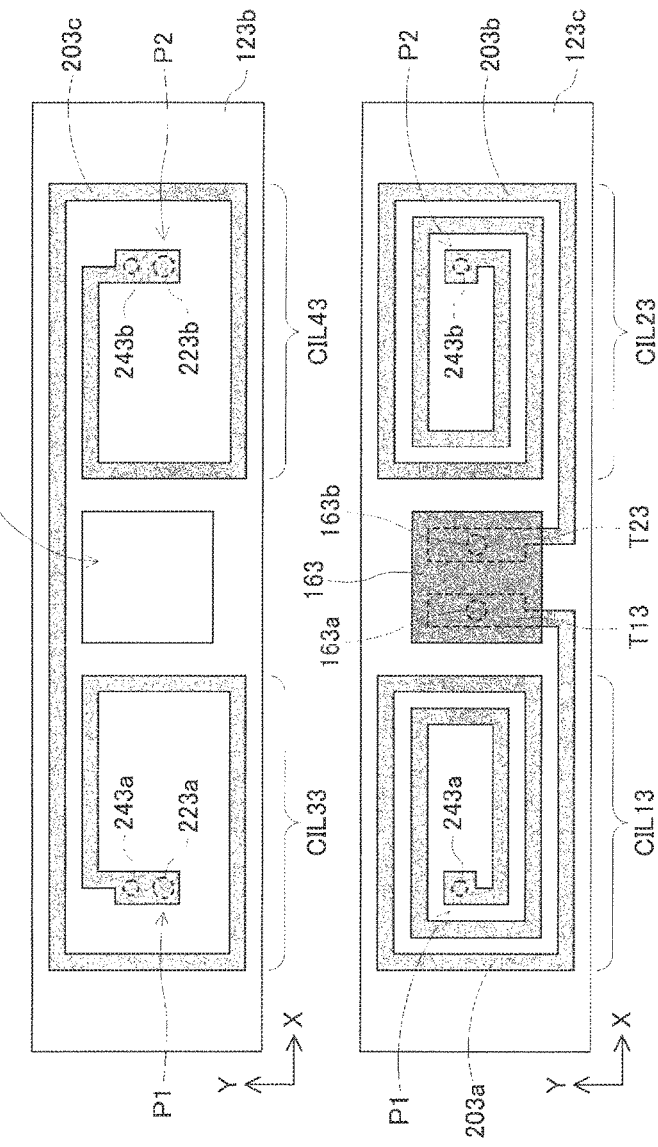

A further example of the multilayer substrate 12 of the RFIC module 10 according to a ninth preferred embodiment of the present invention is shown in FIGS. 19A to 19C. The main differences from the multilayer substrate 12 shown in FIGS. 17A to 17C are in the respective opening areas of the third coil portion CIL32 and the fourth coil portion CIL42.

According to FIGS. 19A to 19C, the multilayer substrate preferably includes three laminated sheet-shaped insulation layers 123a to 123c. Among these layers, the insulation layer 123a is an upper layer, the insulation layer 123b is an intermediate layer, and the insulation layer 123c is a lower layer.

A first terminal electrode 143a and a second terminal electrode 143b are provided on one principal surface of the insulation layer 123a. The first terminal electrode 143a is disposed on the negative side in the X-axis direction and the second terminal electrode 143b is disposed on the positive side in the X-axis direction.

At the center or approximate center position of one principal surface of the insulation layer 123b, a rectangular or substantially rectangular through-hole HL13 is preferably provided, and extends to the other principal surface. The size of the through-hole HL13 is matched to the size of an RFIC chip 163. A coil pattern 203c preferably made of flexible copper foil and extending in a belt shape, for example, is provided around the through-hole HL13 on the one principal surface of the insulation layer 123b.

One end of the coil pattern 203c is disposed at a position overlapping with the first terminal electrode 143a in the planar view and is connected to the first terminal electrode 143a by an interlayer connection conductor 223a extending in the Z-axis direction. The other end of the coil pattern 203c is disposed at a position overlapping with the second terminal electrode 143b in the planar view and is connected to the second terminal electrode 143b by an interlayer connection conductor 223b extending in the Z-axis direction. The interlayer connection conductors 223a, 223b and interlayer connection conductors 243a, 243b described later are preferably hard metal masses containing Sn as a main component, for example.

Assuming that the one end of the coil pattern 203c is a starting end, the coil pattern 203c preferably winds around the one end once in the clockwise direction, extends to near the end portion of the positive side in the Y-axis direction, and then extends into the positive side in the X-axis direction. The coil pattern 203c subsequently bends near the end portion of the positive side in the X-axis direction toward the negative side in the Y-axis direction and winds around the other end once in the clockwise direction before extending to the other end.

Coil patterns 203a and 203b preferably made of flexible copper foil and extending in a belt shape, for example, are provided on one principal surface of the insulation layer 123c. In a planar view of the insulation layers 122b and 122c, one end of the coil pattern 203a is disposed at a position on the positive side in the Y-axis direction as compared to the one end of the coil pattern 203c, and the other end of the coil pattern 203a (a first coil end T13) is disposed at a position on the negative side in the X-axis direction inside a rectangular or substantially rectangular shape defined by the through-hole HL13.

One end of the coil pattern 203b is disposed at a position on the positive side in the Y-axis direction as compared to the other end of the coil pattern 203c, and the other end of the coil pattern 203b (a second coil end T23) is disposed at a position on the positive side in the X-axis direction inside the rectangular or substantially rectangular shape defined by the through-hole HL13. Both of the first coil end T13 and the second coil end T23 preferably have a rectangular or substantially rectangular shape with the long sides extending in the Y-axis direction in the planar view of the insulation layer 123c.

Assuming that the one end of the coil pattern 203a is a starting point, the coil pattern 203a preferably winds around the one end about 2.5 times in the counterclockwise direction and subsequently bends toward the positive side in the Y-axis direction to extend to the other end. Similarly, assuming that the one end of the coil pattern 203b is a starting point, the coil pattern 203b winds around the one end about 2.5 times in the clockwise direction and subsequently bends toward the positive side in the Y-axis direction to extend to the other end. The one end of the coil pattern 203a is connected to the one end of the coil pattern 203c by the interlayer connection conductor 243a extending in the Z-axis direction, and the one end of the coil pattern 203b is connected to the other end of the coil pattern 203c by the interlayer connection conductor 243b extending in the Z-axis direction.

The power feeding circuit 18 includes the coil patterns 203a to 203c and the interlayer connection conductors 243a and 243b arranged in this manner. In this case, a conductor portion of the coil pattern 203a except the first coil end T13 is defined as a "first coil portion CIL13" and a conductor portion of the coil pattern 203b except the second coil end T23 is defined as a "second coil portion CIL23." A conductor portion of the coil pattern 203c on the negative side in the X-axis direction relative to the through-hole HL13 is defined as a "third coil portion CIL33" and a conductor portion of the coil pattern 203c on the positive side in the X-axis direction relative to the through-hole HL13 is defined as a "fourth coil portion CIL43."

The position of the one end of the coil pattern 203a or the one end of the coil pattern 203c corresponds to the "first position P1" and the position of the one end of the coil pattern 203b or the other end of the coil pattern 203c corresponds to the "second position P2."

A first input/output terminal 163a and a second input/output terminal 163b are disposed on the other principal surface of the RFIC chip 163. Specifically, the first input/output terminal 163a is located on the negative side in the X-axis direction, and the second input/output terminal 163b is located on the positive side in the X-axis direction. The RFIC chip 163 is mounted on the one principal surface of the insulation layer 123c such that the first input/output terminal 163a and the second input/output terminal 163b arranged in this manner are connected to the first coil end T13 and the second coil end T23.

As compared to the multilayer substrate 12 shown in FIGS. 17A to 17C, this multilayer substrate 12 also preferably includes the inductance value of the first coil portion CIL13 greater than the inductance value of the third coil portion CIL33 and the inductance value of the second coil portion CIL23 greater than the inductance value of the fourth coil portion CIL43.

When viewed in the Z-axis direction, the opening center of the first coil portion CIL13 and the opening center of the third coil portion CIL33 do not overlap with the first terminal electrode 143a and, similarly, the opening center of the second coil portion CIL23 and the opening center of the fourth coil portion CIL43 do not overlap with the second terminal electrode 143b.

However, the opening area of the third coil portion CIL33 is preferably greater than the opening area of the third coil portion CIL31 shown in FIG. 17B, and the opening area of the fourth coil portion CIL43 is preferably greater than the opening area of the fourth coil portion CIL41 shown in FIG. 17B.

Therefore, the magnetic field produced by the first coil portion CIL11 and the third coil portion CIL31 and the magnetic field produced by the second coil portion CIL21 and the fourth coil portion CIL41 become greater than those of the multilayer substrate 12 shown in FIGS. 17A to 17C.

Tenth Preferred Embodiment

Yet another example of the multilayer substrate 12 of the RFIC module 10 according to a tenth preferred embodiment of the present invention is shown in FIGS. 20A to 20C. The main differences from the multilayer substrate 12 shown in FIGS. 14A to 14C are in the respective opening areas of a first coil portion CIL14 and a second coil portion CIL24, the respective winding numbers and opening areas of the third coil portion CIL32 and the fourth coil portion CIL42, and the arrangement of the interlayer connection conductors 224a to 224b, 244a to 244b.

According to FIGS. 20A to 20C, the multilayer substrate preferably includes three laminated sheet-shaped insulation layers 124a to 124c, for example. Among these layers, the insulation layer 124a is an upper layer, the insulation layer 124b is an intermediate layer, and the insulation layer 124c is a lower layer.

A first terminal electrode 144a and a second terminal electrode 144b are provided on one principal surface of the insulation layer 124a. The first terminal electrode 144a is disposed on the negative side in the X-axis direction and the second terminal electrode 144b is disposed on the positive side in the X-axis direction.

At the center or approximate center position of one principal surface of the insulation layer 124b, a rectangular or substantially rectangular through-hole HL14 is preferably provided, and extends to the other principal surface. The size of the through-hole HL14 is matched to the size of an RFIC chip 164. A coil pattern 204c preferably made of flexible copper foil and extending in a belt shape, for example, is provided around the through-hole HL14 on the one principal surface of the insulation layer 124b.

One end of the coil pattern 204c is disposed at a position overlapping with the first terminal electrode 144a in the planar view and is connected to the first terminal electrode 144a by the interlayer connection conductor 224a extending in the Z-axis direction. The other end of the coil pattern 204c is disposed at a position overlapping with the second terminal electrode 144b in the planar view and is connected to the second terminal electrode 144b by the interlayer connection conductor 224b extending in the Z-axis direction. The interlayer connection conductors 224a, 224b and the interlayer connection conductors 244a, 244b described later are preferably hard metal masses containing Sn as a main component, for example.

Assuming that the one end of the coil pattern 204c is a starting end, the coil pattern 204c winds around the one end twice in the clockwise direction, extends to near the end portion of the positive side in the Y-axis direction, and then extends into the positive side in the X-axis direction. The coil pattern 204c subsequently bends near the end portion of the positive side in the X-axis direction toward the negative side in the Y-axis direction and winds around the other end twice in the clockwise direction before extending to the other end.

Coil patterns 204a and 204b preferably made of flexible copper foil and extending in a belt shape, for example, are provided on one principal surface of the insulation layer 124c. In a planar view of the insulation layers 124b and 124c, one end of the coil pattern 204a is disposed at a position overlapping with the one end of the coil pattern 204c, and the other end of the coil pattern 204a (a first coil end T14) is disposed at a position on the negative side in the X-axis direction inside a rectangular or substantially rectangular shape defined by the through-hole HL14.

One end of the coil pattern 204b is disposed at a position overlapping with the other end of the coil pattern 204c, and the other end of the coil pattern 204b (a second coil end T24) is disposed at a position on the positive side in the X-axis direction inside the rectangular or substantially rectangular shape defined by the through-hole HL14. Both of the first coil end T14 and the second coil end T24 preferably have a rectangular or substantially rectangular shape with the long sides extending in the Y-axis direction in the planar view of the insulation layer 124c.

Assuming that the one end of the coil pattern 204a is a starting point, the coil pattern 204a winds around the one end about 2.5 times in the counterclockwise direction and subsequently bends toward the positive side in the Y-axis direction to extend to the other end. Similarly, assuming that the one end of the coil pattern 204b is a starting point, the coil pattern 204b winds around the one end about 2.5 times in the clockwise direction and subsequently bends toward the positive side in the Y-axis direction to extend to the other end. The one end of the coil pattern 204a is connected to the one end of the coil pattern 204c by the interlayer connection conductor 244a extending in the Z-axis direction, and the one end of the coil pattern 204b is connected to the other end of the coil pattern 202c by the interlayer connection conductor 244b extending in the Z-axis direction.

The power feeding circuit 18 includes the coil patterns 204a to 204c and the interlayer connection conductors 244a and 244b arranged in this manner. In this case, a conductor portion of the coil pattern 204a except the first coil end T14 is defined as the "first coil portion CIL14" and a conductor portion of the coil pattern 204b except the second coil end T24 is defined as the "second coil portion CIL24." A conductor portion of the coil pattern 204c on the negative side in the X-axis direction relative to the through-hole HL14 is defined as a "third coil portion CIL34" and a conductor portion of the coil pattern 204c on the positive side in the X-axis direction relative to the through-hole HL14 is defined as a "fourth coil portion CIL44."

The position of the one end of the coil pattern 204a or the one end of the coil pattern 204c corresponds to the "first position P1" and the position of the one end of the coil pattern 204b or the other end of the coil pattern 204c corresponds to the "second position P2."

A first input/output terminal 164a and a second input/output terminal 164b are disposed on the other principal surface of the RFIC chip 164. Specifically, the first input/output terminal 164a is located on the negative side in the X-axis direction, and the second input/output terminal 164b is located on the positive side in the X-axis direction. The RFIC chip 164 is mounted on the one principal surface of the insulation layer 124c such that the first input/output terminal 164a and the second input/output terminal 164b arranged in this manner are connected to the first coil end T14 and the second coil end T24.

As can be seen from a comparison with the multilayer substrate 12 shown in FIGS. 17A to 17C, the winding number of the third coil portion CIL34 is preferably greater than the winding number of the third coil portion CIL31, and the winding number of the fourth coil portion CIL44 is preferably greater than the winding number of the fourth coil portion CIL41.

The opening area of the first coil portion CIL14 is preferably smaller than the opening area of the first coil portion CIL11, and the opening area of the second coil portion CIL24 is preferably smaller than the opening area of the second coil portion CIL21.

When viewed in the Z-axis direction, the opening center of the first coil portion CIL14 and the opening center of the third coil portion CIL34 do not overlap with the first terminal electrode 144a, and the opening center of the second coil portion CIL24 and the opening center of the fourth coil portion CIL44 do not overlap with the second terminal electrode 144b.

As a result, the magnetic field produced by the first coil portion CIL14 and the third coil portion CIL34 becomes stable and, similarly, the magnetic field produced by the second coil portion CIL24 and the fourth coil portion CIL44 becomes stable.

Eleventh Preferred Embodiment

Figure 21:
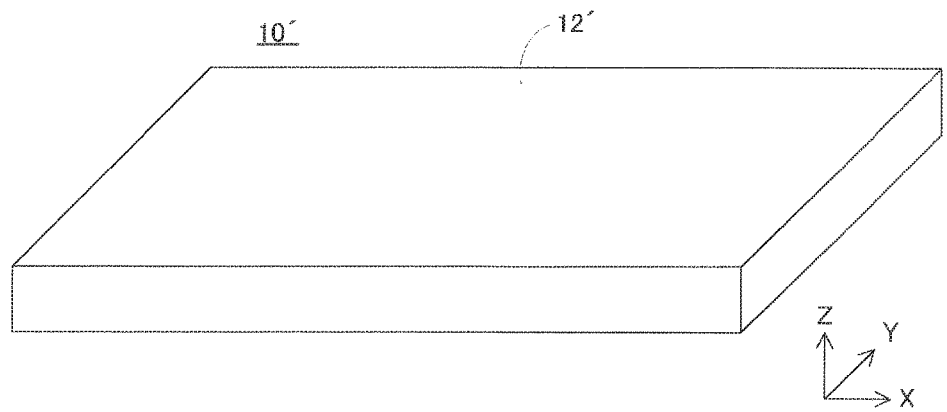
FIG. 21 is a perspective view of an RFID module according to a preferred embodiment of the present invention viewed obliquely from above.
Figure 22:
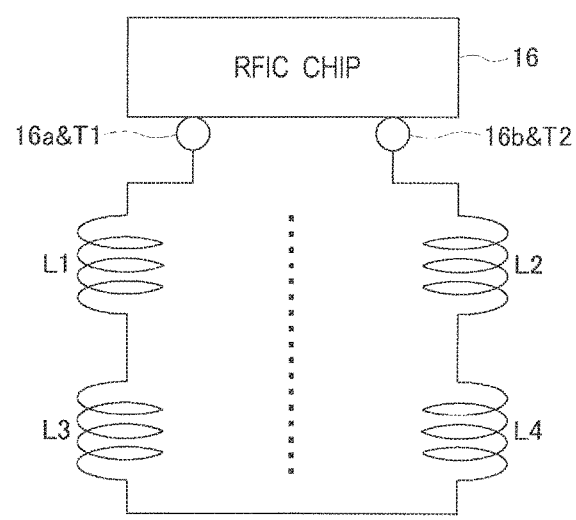
FIG. 22 is a circuit diagram of an equivalent circuit of the RFIC module shown in FIG. 21.

Referring to FIGS. 21 and 22, an RFIC module 10' of an eleventh preferred embodiment of the present invention is the same as or similar to the RFIC module 10 shown in FIG. 1 except that the first terminal electrode 14a, the second terminal electrode 14b, and the interlayer connection conductors 22a, 22b shown in FIG. 4A are removed and, therefore, the same constituent elements will not be described again.

As described above, the inductors L1 and L2 affect the resonance frequency, and the first coil portion CIL1 and the second coil portion CIL2 corresponding to the respective inductors L1 and L2 define and function as an antenna element.

Therefore, the RFIC module 10' does not include two terminal electrodes to be connected to the antenna conductors 34a and 34b shown in FIGS. 7A to 7B and also does not include interlayer connection conductors to be extended from the connection points of the first coil portion CIL1 and the third coil portion CIL3 and interlayer connection conductors to be extended from the connection points of the second coil portion CIL2 and the fourth coil portion CIL4. As a result, a small-sized RFID tag is provided.

The RFIC module 10' is able to be included in the multilayer substrate 12 shown in FIGS. 17A to 17C with the first terminal electrode 141a, the second terminal electrode 141b, and the interlayer connection conductors 221a, 221b removed, is able to be included in the multilayer substrate 12 shown in FIGS. 18A to 18C with the first terminal electrode 142a, the second terminal electrode 142b, and the interlayer connection conductors 222a, 222b removed, is able to be included in the multilayer substrate 12 shown in FIGS. 19A to 19C with the first terminal electrode 143a, the second terminal electrode 143b, and the interlayer connection conductors 223a, 223b removed, or is able to be included in the multilayer substrate 12 shown in FIGS. 20A to 20C with the first terminal electrode 144a, the second terminal electrode 144b, and the interlayer connection conductors 224a, 224b removed.

For reference, the multilayer substrate 12 shown in FIGS. 17A to 17C including the first terminal electrode 141a, the second terminal electrode 141b, and the interlayer connection conductors 221a, 221b removed is shown in FIGS. 23A to 23C.

The configurations of the multiple preferred embodiments disclosed herein are able to be combined as needed without contradiction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An RFIC module comprising:
a flexible substrate;
an RFIC chip mounted on the substrate and including a first input/output terminal and a second input/output terminal;

a power feeding circuit including a coil conductor including a first coil end and a second coil end respectively connected to the first input/output terminal and the second input/output terminal; and
a first terminal electrode and a second terminal electrode respectively disposed on a principal surface of the substrate and connected to the coil conductor; wherein
the coil conductor includes a first coil portion and a second coil portion, respectively including a winding axis extending in a direction intersecting with the principal surface of the substrate;
the first coil portion and the second coil portion are located at positions with the RFIC chip interposed therebetween and not overlapping with the RFIC chip in a planar view of the substrate;
the first terminal electrode is located at a position which overlap with the first coil portion; and
the second terminal electrode is located at a position which overlap with the second coil portion.

2. The RFIC module according to claim 1, wherein the RFIC chip is built into the substrate, and the power feeding circuit is disposed at a position overlapping with the RFIC chip when viewed in a direction perpendicular to a predetermined side surface of the substrate.

3. The RFIC module according to claim 1, wherein
the principal surface of the substrate has a rectangular or substantially rectangular shape; and
the first coil portion and the second coil portion are respectively located on opposed end sides of the long sides defining the rectangular or substantially rectangular shape.

4. The RFIC module according to claim 1, wherein in the planar view of the substrate, the first terminal electrode partially overlaps with a portion of the first coil portion spaced away from the RFIC chip, and the second terminal electrode partially overlaps with a portion of the second coil portion spaced away from the RFIC chip.

5. The RFIC module according to claim 1, wherein the first coil portion and the second coil portion are connected and wound such that magnetic fields generated by the first and second coil portions are in phase.

6. The RFIC module according to claim 5, wherein inductance values of the first coil portion and the second coil portion are larger than inductance values of the third coil portion and the fourth coil portion, respectively.

7. The RFIC module according to claim 1, wherein in the planar view of the substrate, the first terminal electrode does not overlap with a center or an approximate center of a coil opening of the first coil portion and the second terminal electrode does not overlap with a center or an approximate center of a coil opening of the second coil portion.

8. The RFIC module according to claim 1, wherein the first terminal electrode is connected to a first position of the coil conductor, the second terminal electrode is connected to a second position of the coil conductor, the coil conductor further includes a third coil portion and a fourth coil portion connected in series between the first position and the second position and respectively overlapping with the first coil portion and the second coil portion in the planar view of the substrate.

9. The RFIC module according to claim 8, wherein the power feeding circuit further includes a first connection conductor extending in a thickness direction of the substrate at a position overlapping with the first terminal electrode in the planar view of the substrate to connect the first coil portion and the third coil portion in series, and a second connection conductor extending in a thickness direction of the substrate at a position overlapping with the second terminal electrode in the planar view of the substrate to connect the second coil portion and the fourth coil portion in series.

10. The RFIC module according to claim 8, wherein the first coil portion, the second coil portion, the third coil portion, and the fourth coil portion are connected and wound such that magnetic fields generated by the coil conductor are in phase among the first coil portion, the second coil portion, the third coil portion, and the fourth coil portion.

11. The RFIC module according to claim 8, wherein
the third coil portion and the fourth coil portion are disposed on a layer of the substrate adjacent to a layer of the substrate on which the first and second terminal electrodes are provided; and
the first coil portion and the second coil portion are disposed on a layer of the substrate that is adjacent to the layer of the substrate on which the third coil portion and the fourth coil portion are disposed and that is on a side opposite to the layer of the substrate on which the first and second terminal electrodes are provided.

12. An RFID tag comprising:
an RFIC module; and
an antenna element connected to the RFIC module; wherein
the RFIC module includes:
  a flexible substrate;
  an RFIC chip mounted on the substrate and including a first input/output terminal and a second input/output terminal;
  a power feeding circuit including a coil conductor including a first coil end and a second coil end respectively connected to the first input/output terminal and the second input/output terminal; and
  a first terminal electrode and a second terminal electrode respectively disposed on a principal surface of the substrate and connected to the coil conductor; wherein
the coil conductor includes a first coil portion and a second coil portion, respectively including a winding axis extending in a direction intersecting with the principal surface of the substrate;
the first coil portion and the second coil portion are located at positions with the RFIC chip interposed therebetween and not overlapping with the RFIC chip in a planar view of the substrate;
the first terminal electrode is located at a position which overlap with the first coil portion; and
the second terminal electrode is located at a position which overlap with the second coil portion.

13. The RFID tag according to claim 12, wherein the antenna element is a dipole antenna element including a first antenna portion connected at one end to the first terminal electrode and a second antenna portion connected at one end to the second terminal electrode.

14. The RFID tag according to claim 12, wherein the antenna element is a loop antenna element including one end connected to the first terminal electrode and another end connected to the second terminal electrode.

* * * * *